United States Patent
Ooki et al.

(10) Patent No.: US 8,991,184 B2
(45) Date of Patent: Mar. 31, 2015

(54) HYBRID CONSTRUCTION MACHINE

(75) Inventors: Takatoshi Ooki, Kasumigaura (JP); Hidetoshi Satake, Ishioka (JP); Kouji Ishikawa, Kasumigaura (JP); Shinji Nishikawa, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 558 days.

(21) Appl. No.: 13/428,484

(22) Filed: Mar. 23, 2012

(65) Prior Publication Data

US 2012/0240582 A1  Sep. 27, 2012

(30) Foreign Application Priority Data

Mar. 25, 2011  (JP) ................. 2011-068649

(51) Int. Cl.
*F15B 13/10* (2006.01)
*E02F 9/22* (2006.01)
*E02F 9/12* (2006.01)
*E02F 9/20* (2006.01)
*B60K 6/12* (2006.01)
*B60K 6/48* (2007.10)

(52) U.S. Cl.
CPC ............ *E02F 9/2217* (2013.01); *E02F 9/123* (2013.01); *E02F 9/2075* (2013.01); *E02F 9/2095* (2013.01); *E02F 9/2235* (2013.01); *E02F 9/2296* (2013.01); *B60K 6/12* (2013.01); *B60K 6/48* (2013.01); *B60W 2300/17* (2013.01); *Y02T 10/6282* (2013.01); *Y02T 10/6208* (2013.01); *Y02T 10/6221* (2013.01)
USPC ............. 60/711; 60/450; 60/451; 180/65.265

(58) Field of Classification Search
CPC ....... E02F 9/123; E02F 9/2075; E02F 9/2091; E02F 9/2095; E02F 9/2217; E02F 9/2235; E02F 9/2296; E02F 9/2282; E02F 9/2285; B60K 6/12; B60K 6/48; B60W 2300/17; Y02T 10/6221; Y02T 10/6286; Y02T 10/6208; Y02T 10/6282
USPC .......... 60/711, 414, 459, 417, 450, 451, 460, 60/486; 180/65.265
See application file for complete search history.

(56) References Cited

U.S. PATENT DOCUMENTS 7,565,801 B2 * 7/2009 Tozawa et al. ............... 60/414
8,548,661 B2 * 10/2013 Wu ................................ 701/22

FOREIGN PATENT DOCUMENTS

| JP | 2005-290882 A | 10/2005 |
| JP | 4024120 B2 | 10/2007 |
| JP | 2008-063888 A | 3/2008 |

* cited by examiner

*Primary Examiner* — Dwayne J White
*Assistant Examiner* — Logan Kraft
(74) *Attorney, Agent, or Firm* — Mattingly & Malur, PC

(57) ABSTRACT

Provided is a hybrid construction machine (driving the upper swing structure using a hydraulic motor and an electric motor together) capable of regenerating the energy of the upper swing structure in deceleration or stopping into electric power and using the regenerated electric power for assisting the driving of the upper swing structure, while also being capable of securing satisfactory operational feeling and operation capability even when the electric motor does not operate. When the electric motor is not driven, a controller controls a hydraulic circuit system (specifically, a swing direction/flow rate control valve, a center bypass cut valve and a regulator) so as to increase output torque of the hydraulic motor by an amount corresponding to torque to be compensated for the non-driving of the electric motor compared to cases where the electric motor is driven.

10 Claims, 16 Drawing Sheets

HYBRID CONSTRUCTION MACHINE

BACKGROUND OF THE INVENTION

1. Field of the Invention

The present invention relates to a hybrid construction machine, and in particular, to a hybrid construction machine whose upper swing structure is driven with a hydraulic motor and an electric motor.

2. Description of the Related Art

Hydraulic actuators have been used widely in the field of construction machines since devices in the construction machine can be implemented in small sizes and light weights relative to the outputs of the devices. In recent years, however, construction machines equipped with electric actuators for increasing the energy efficiency are being proposed and some of such construction machines are already in practical use today. Especially, a swing actuator for driving and swinging the upper swing structure of a construction machine with respect to the lower travel structure is a rotary actuator of a high inertial load that is used (started and stopped) frequently. Using an electric actuator as the swing actuator is highly advantageous for improving the energy efficiency since energy recovery (energy regeneration) can be expected when the upper swing structure is decelerated or stopped.

In the situation described above, construction machines driving the upper swing structure using a hydraulic motor and an electric motor together have become known as hydraulic construction machines capable of conducting the energy recovery with high efficiency, as described in Japanese Patent No. 4024120, JP,A 2005-290882 and JP,A 2008-63888.

SUMMARY OF THE INVENTION

By driving the upper swing structure using a hydraulic motor and an electric motor together as in the techniques described in Japanese Patent No. 4024120, JP,A 2005-290882 and JP,A 2008-63888, the energy of the upper swing structure in deceleration or stopping can be regenerated into electric power by the electric motor functioning as an electric generator and the energy efficiency can be improved.

In the techniques described in Japanese Patent No. 4024120, JP,A 2005-290882 and JP,A 2008-63888, however, the upper swing structure has to be driven with the hydraulic motor alone and the torque for driving the upper swing structure (swing torque) becomes insufficient when the need of stopping the function of the electric motor has arisen due to failure of the electric motor, voltage abnormality of an electricity storage device (e.g., battery), etc. In such cases, the operator cannot have a satisfactory operational feeling and that can lead to deterioration in the operation capability (workability).

It is therefore the primary object of the present invention to provide a hybrid construction machine (construction machine driving the upper swing structure using a hydraulic motor and an electric motor together) capable of regenerating the energy of the upper swing structure in deceleration or stopping into electric power and using the regenerated electric power for assisting the driving of the upper swing structure, while also being capable of securing satisfactory operational feeling and operation capability even when the electric motor does not operate.

(1) In order to achieve the above object, the present invention provides a hybrid construction machine comprising: a lower travel structure; an upper swing structure which is mounted on the lower travel structure to be capable of swinging; a hydraulic circuit system which includes a swing hydraulic motor driving and swinging the upper swing structure, a hydraulic pump supplying hydraulic fluid to the swing hydraulic motor, a tank receiving the hydraulic fluid returning from the swing hydraulic motor and serving as the source of supply of the hydraulic fluid to the hydraulic pump, and a direction/flow rate control valve arranged in a line connecting the hydraulic pump and the swing hydraulic motor and controlling the direction and the flow rate of the hydraulic fluid discharged from the hydraulic pump and supplied to the swing hydraulic motor; a prime mover which drives the hydraulic pump; a swing electric motor which drives and swings the upper swing structure in an auxiliary manner, the swing electric motor functioning as an electric generator when the swinging of the upper swing structure is decelerating; an electricity storage device which receives and supplies electric energy from/to the swing electric motor; and a control device which controls the operation of the swing electric motor. When the swing electric motor is not driven, the control device controls the hydraulic circuit system so as to increase output torque of the swing hydraulic motor by an amount corresponding to torque to be compensated for the non-driving of the swing electric motor compared to cases where the swing electric motor is driven.

In the hybrid construction machine configured as above, the upper swing structure is driven by using the swing hydraulic motor and the swing electric motor together. Therefore, the energy of the upper swing structure in deceleration or stopping can be regenerated into electric power and the regenerated electric power can be used for assisting the driving of the upper swing structure. Further, when the swing electric motor is not driven, the hydraulic circuit system is controlled so as to increase the output torque of the swing hydraulic motor by an amount corresponding to torque to be compensated for the non-driving of the swing electric motor compared to cases where the swing electric motor is driven. Therefore, the drop in the swing torque is compensated for and satisfactory operational feeling and operation capability can be secured even when the electric motor does not operate.

(2) Preferably, in the hybrid construction machine (1), when the swing electric motor is not driven, the control device controls the hydraulic circuit system to increase meter-in pressure or meter-out pressure of the swing hydraulic motor in order to increase the output torque of the swing hydraulic motor.

With the above configuration, the output torque of the swing hydraulic motor is increased and satisfactory operational feeling and operation capability can be secured even when the electric motor does not operate.

(3) Preferably, in the hybrid construction machine (2), the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank. When the swing electric motor is not driven, the control device executes control to increase braking torque of the swing hydraulic motor by increasing the meter-out pressure of the swing hydraulic motor by controlling the meter-out restrictor of the direction/flow rate control valve in its closing direction.

With the above configuration, the braking torque (output torque) of the swing hydraulic motor can be increased just by controlling the direction/flow rate control valve, without the need of adding a special valve.

(4) Preferably, in the hybrid construction machine (2), the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank. The hydraulic circuit system further includes an auxiliary valve arranged in a meter-out hydraulic line through which the hydraulic fluid passing through the meter-out restrictor of the direction/flow rate control valve flows. When the swing electric motor is not driven, the control device executes control to increase braking torque of the swing hydraulic motor by increasing the meter-out pressure of the swing hydraulic motor by controlling the auxiliary valve to narrow the meter-out hydraulic line by use of a composite restrictor made up of the meter-out restrictor of the direction/flow rate control valve and an restrictor of the auxiliary valve.

With the above configuration, the braking torque (output torque) of the swing hydraulic motor can be increased by simple control since it is unnecessary to control the meter-out restrictor of the direction/flow rate control valve in its closing direction.

(5) Preferably, in the hybrid construction machines (2)-(4), the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank. The hydraulic circuit system further includes an auxiliary valve arranged in an open center hydraulic line through which the hydraulic fluid passing through the bleed-off restrictor of the direction/flow rate control valve flows. When the swing electric motor is not driven, the control device executes control to increase drive torque of the swing hydraulic motor by increasing the meter-in pressure of the swing hydraulic motor by controlling the auxiliary valve to narrow the open center hydraulic line by use of a composite restrictor made up of the bleed-off restrictor of the direction/flow rate control valve and an restrictor of the auxiliary valve.

With the above configuration, the drive torque (output torque) of the swing hydraulic motor can be increased by simple control since it is unnecessary to control the bleed-off restrictor of the direction/flow rate control valve in its closing direction.

(6) Preferably, in the hybrid construction machines (2)-(4), the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank. When the swing electric motor is not driven, the control device executes control to increase drive torque of the swing hydraulic motor by increasing the meter-in pressure of the swing hydraulic motor by controlling the bleed-off restrictor of the direction/flow rate control valve in its closing direction.

With the above configuration, the drive torque (output torque) of the swing hydraulic motor can be increased just by controlling the direction/flow rate control valve, without the need of adding a special valve.

(7) Preferably, in the hybrid construction machine (3) or (6), the hydraulic circuit system further includes an operating device which outputs an operating signal for driving the direction/flow rate control valve. When the swing electric motor is not driven, the control device controls the meter-out restrictor or the bleed-off restrictor of the direction/flow rate control valve in its closing direction by controlling the operating signal from the operating device.

(8) Preferably, in the hybrid construction machine (7), the operating device includes a pressure-reducing valve which generates operation command pressure as the operating signal. The control device includes a solenoid-operated proportional pressure-reducing valve which controls the operation command pressure.

(9) Preferably, in the hybrid construction machine (4) or (5), the control device includes a solenoid-operated proportional pressure-reducing valve which outputs control pressure for driving control of the auxiliary valve.

(10) Preferably, in the hybrid construction machines (1)-(9), when the swing electric motor is not driven, the control device executes control to increase output torque of the hydraulic pump in order to increase the output of the swing hydraulic motor.

With the above configuration, hydraulic torque necessary for raising the meter-in pressure of the swing hydraulic motor and increasing the drive torque (acceleration torque) of the swing hydraulic motor can be supplied when the swing electric motor is not driven.

According to the present invention, in construction machines driving the upper swing structure by using a hydraulic motor and an electric motor together, the energy of the upper swing structure in deceleration or stopping can be regenerated into electric power and the regenerated electric power can be used for assisting the driving of the upper swing structure, while also securing satisfactory operational feeling and operation capability even when the electric motor does not operate.

DESCRIPTION OF THE PREFERRED EMBODIMENTS

Figure 1:
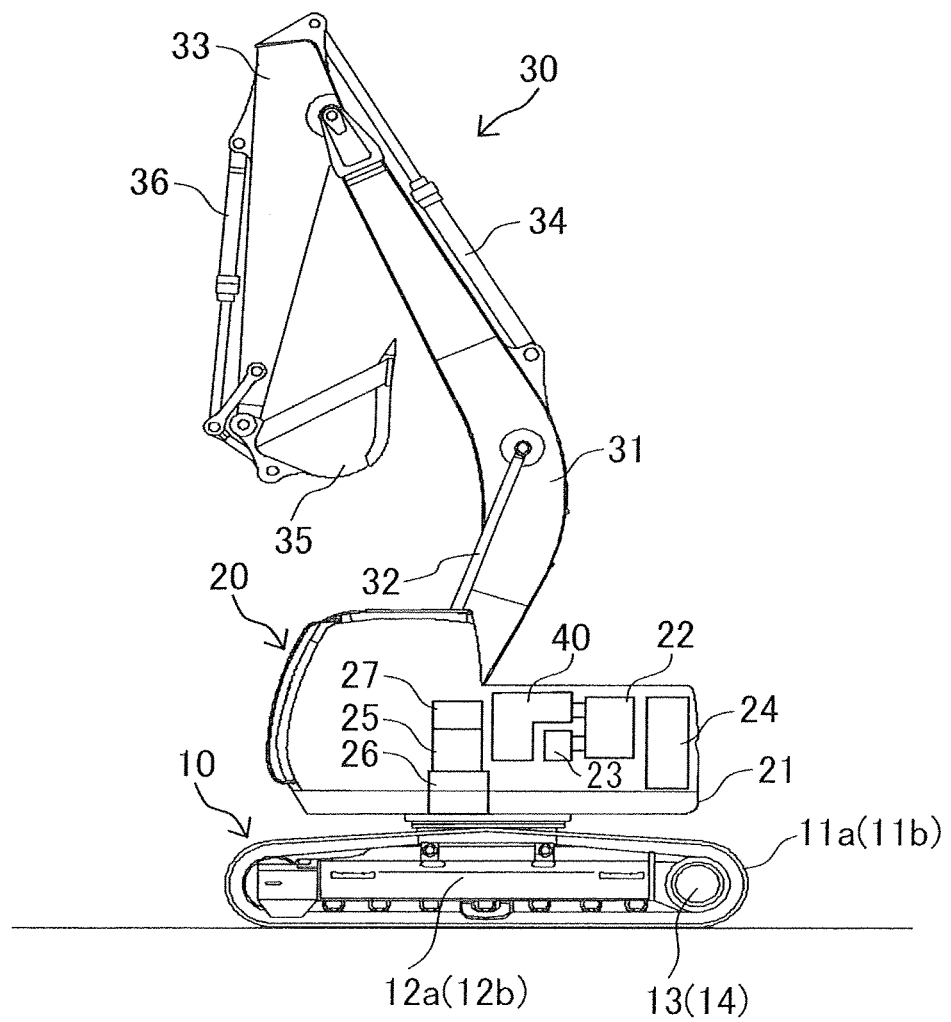
FIG. 1 is a side view of a hybrid hydraulic shovel in accordance with a first embodiment of the present invention.

Referring now to the drawings, a description will be given in detail of preferred embodiments in accordance with the present invention.

The following explanation of the embodiments will be given by taking hydraulic shovels as examples of construction machines. The present invention is applicable to a wide variety of construction machines (e.g., operating machines) having a swing structure and thus the application of the present invention is not restricted to hydraulic shovels. For example, the present invention is applicable also to various other construction machines such as crane vehicles having a swing structure.

<First Embodiment>
<Configuration of Hydraulic Shovel>

FIG. 1 is a side view of a hybrid hydraulic shovel in accordance with a first embodiment of the present invention.

Referring to FIG. 1, the hybrid hydraulic shovel comprises a lower travel structure 10, an upper swing structure 20 and a shovel mechanism 30. The upper swing structure 20 is mounted on the lower travel structure 10 to be capable of swinging.

The lower travel structure 10 includes a pair of crawlers 11a and 11b (only one side is shown in FIG. 1), a pair of crawler frames 12a and 12b, a pair of traveling hydraulic motors 13 and 14 (left traveling hydraulic motor 13, right traveling hydraulic motor 14) for independently driving and controlling the crawlers 11a and 11b, respectively, deceleration mechanisms for the hydraulic motors 13 and 14, etc.

The upper swing structure 20 includes a swing frame 21, an engine 22 (as a prime mover) mounted on the swing frame 21, an electric generator 23 driven by the engine 22, a battery 24 for storing electric power generated by the electric generator 23, a swing electric motor 25 driven by the electric power from the electric generator 23 or the battery 24, and a swing mechanism 26, etc. The swing mechanism 26, including a swing hydraulic motor 27, drives and swings the upper swing structure 20 (swing frame 21) with respect to the lower travel structure 10 using driving force of the swing hydraulic motor 27 and swing electric motor 25. The upper swing structure 20 is driven mainly by the swing hydraulic motor 27 and auxiliarily (in an auxiliary manner) by the swing electric motor 25 conducting the driving in cooperation with the swing hydraulic motor 27.

The shovel mechanism 30 includes a boom 31, a boom cylinder 32 for driving the boom 31, an arm 33 supported by a distal end part of the boom 31 to be rotatable around an axis, an arm cylinder 34 for driving the arm 33, a bucket 35 supported by the distal end of the arm 33 to be rotatable around an axis, a bucket cylinder 36 for driving the bucket 35, etc.

Further, a hydraulic circuit system 40 for driving hydraulic actuators (such as the aforementioned traveling hydraulic motors 13 and 14, swing hydraulic motor 27, boom cylinder 32, arm cylinder 34 and bucket cylinder 36) is mounted on the swing frame 21 of the upper swing structure 20. The hydraulic circuit system 40 includes a hydraulic pump 41 (see FIG. 2) as a hydraulic pressure source for generating the hydraulic pressure and a control valve unit 42 (see FIG. 2) for driving and controlling the actuators. The hydraulic pump 41 is driven by the engine 22.

<System Configuration>

Figure 2:
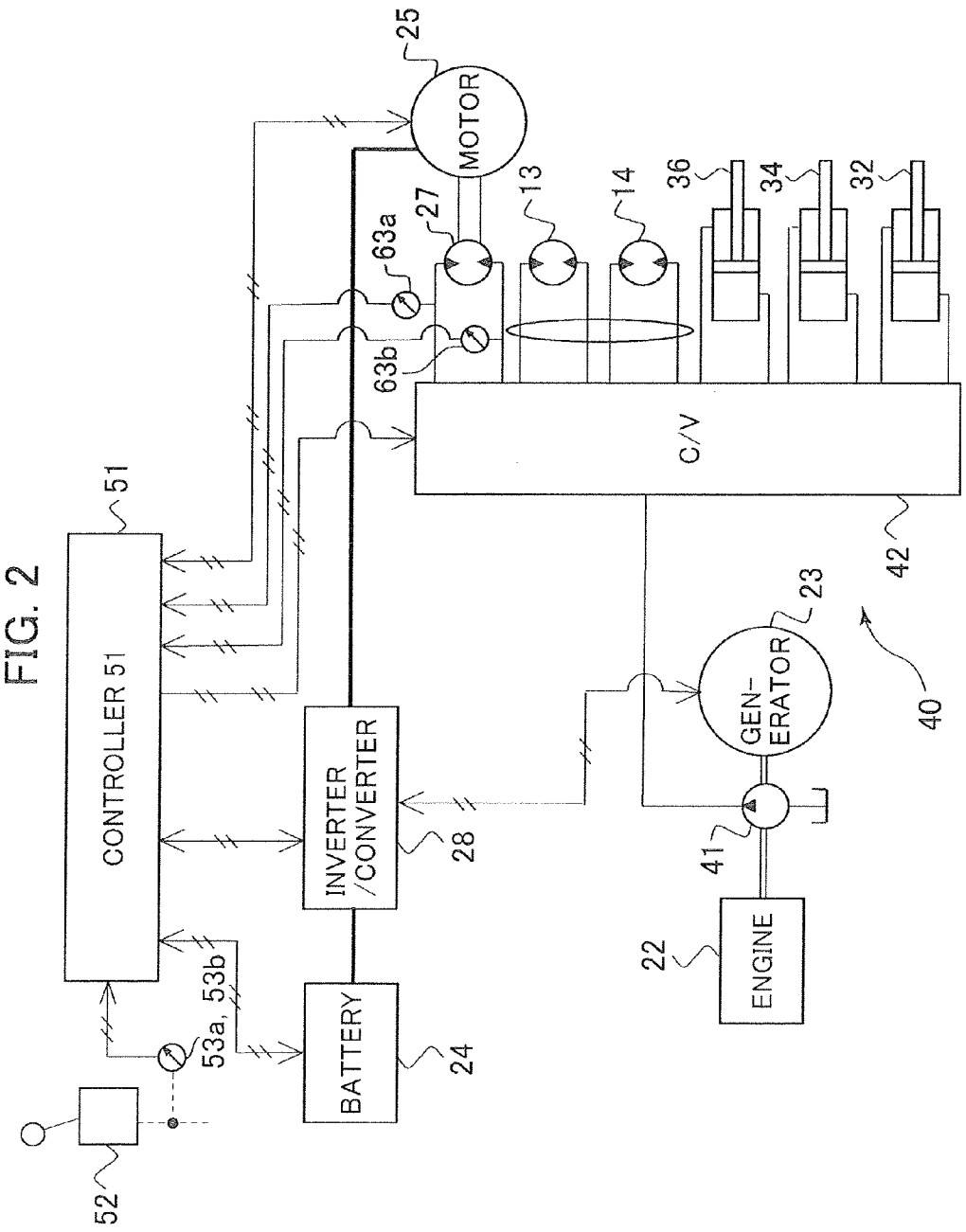
FIG. 2 is a schematic block diagram showing the system configuration of principal electric/hydraulic devices of the hydraulic shovel.

FIG. 2 shows the system configuration of principal electric/hydraulic devices of the hydraulic shovel, wherein components identical with those in FIG. 1 are assigned the same reference characters as in FIG. 1. In FIG. 2, double-lined lines (lines with two obliquely crossing line segments) represent a mechanical driving system, thick solid lines represent an electric driving system, and solid lines of normal thickness represent a hydraulic driving system. As shown in FIG. 2, the driving force of the engine 22 is transmitted to the hydraulic pump 41. The control valve unit 42 includes direction/flow rate control valves (including valve components called spools) for the actuators, respectively. The directions and flow rates of the hydraulic fluid supplied to the swing hydraulic motor 27, the boom cylinder 32, the arm cylinder 34, the bucket cylinder 36 and the traveling hydraulic motors 13 and 14 are controlled by driving the direction/flow rate control valves according to operating signals (operation command pressures) inputted from a lever-operated swing operating device 52 (with a lever for controlling the swinging of the upper swing structure 20) and other lever-operated operating devices (unshown).

DC electric power from the battery 24 is converted by an inverter/converter 28 into a pulse signal at a prescribed voltage and a prescribed frequency and inputted to the swing electric motor 25. The swing electric motor 25 in deceleration is used in its electric generator property. The inverter/converter 28 converts the electric power regenerated by the swing electric motor 25 into DC electric power and stores the electric power in the battery 24.

The inverter/converter 28 controls the revolution speed and the torque of the swing electric motor 25 according to a signal from a controller 51. The controller 51 calculates and outputs the signals to be sent to the inverter/converter 28 and a hydraulic circuit system 40 (a control valve unit 42) based on detection signals inputted from pressure sensors 53a and 53b for detecting the operating signals (operation command pressures) from the swing operating device 52 and pressure sensors 63a and 63b for detecting meter-in pressure and meter-out pressure of the swing hydraulic motor 27.

<Swing Hydraulic System>

Figure 3:
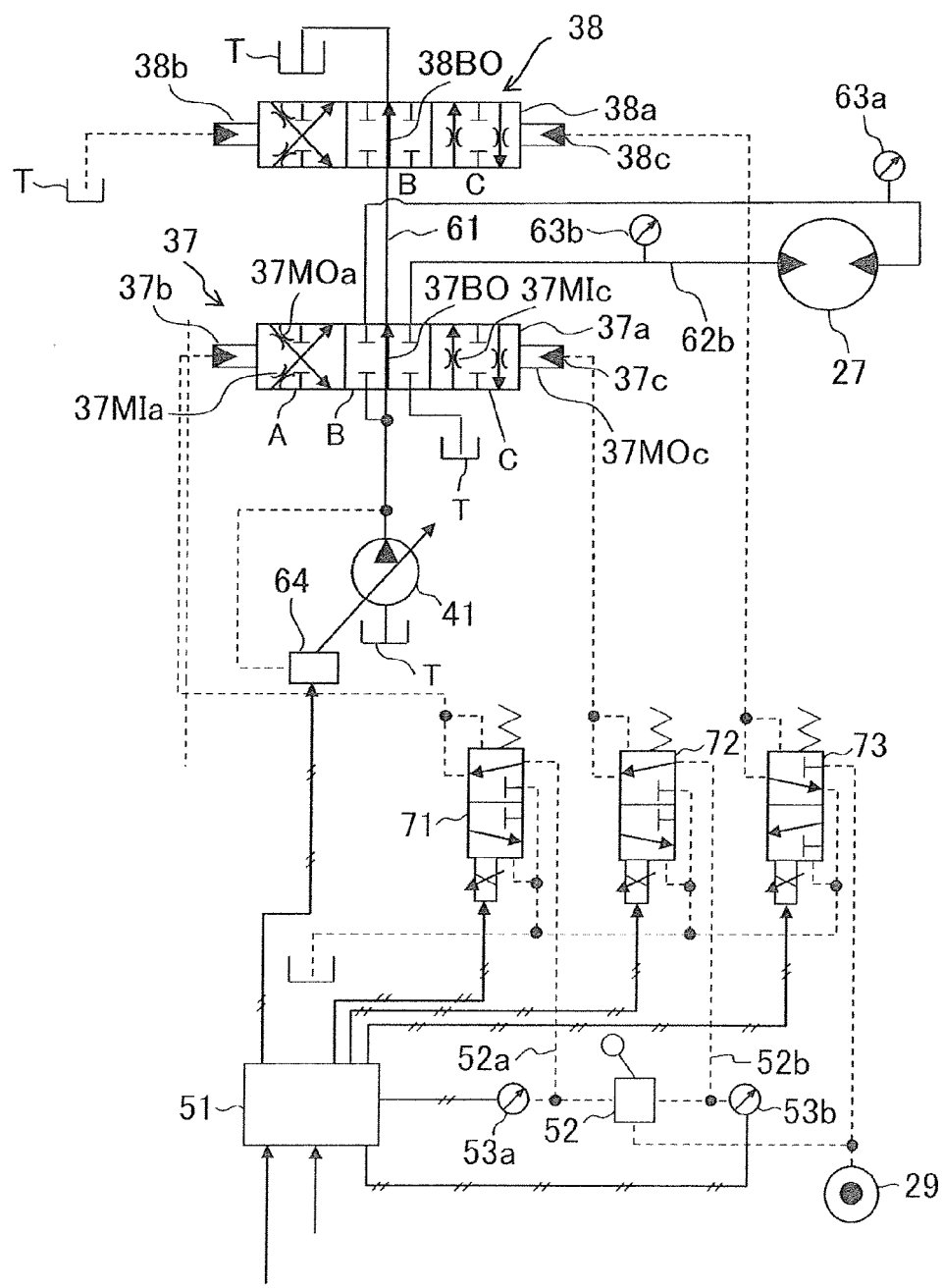
FIG. 3 is a schematic diagram showing the details of a part of a hydraulic circuit system related to a swing section (swing hydraulic system)

FIG. 3 shows the details of a part of the hydraulic circuit system 40 related to the swing section (hereinafter referred to as a "swing hydraulic system"), wherein components identical with those in FIG. 1 or FIG. 2 are assigned the same reference characters as in FIG. 1 or FIG. 2.

Referring to FIG. 3, the swing hydraulic system includes the aforementioned hydraulic pump 41 and swing hydraulic motor 27, a swing direction/flow rate control valve 37, a center bypass cut valve 38 (as a swing auxiliary valve formed using a spare spool), and a tank T. The swing direction/flow rate control valve 37 is arranged in a line connecting the hydraulic pump 41 and the swing hydraulic motor 27 in order to control the direction and the flow rate of the hydraulic fluid discharged from the hydraulic pump 41 and supplied to the swing hydraulic motor 27. The swing direction/flow rate control valve 37 (a valve of the open center type) is arranged in an open center hydraulic line 61 having an upstream end connected to the hydraulic pump 41 and a downstream end connected to the tank T. The center bypass cut valve 38 is arranged in a part of the open center hydraulic line 61 downstream of the swing direction/flow rate control valve 37. The center bypass cut valve 38 controls discharge pressure of the hydraulic pump 41 in cooperation with the swing direction/flow rate control valve 37 when the swing direction/flow rate control valve 37 is switched to an operating position. In the swing direction/flow rate control valve 37, the area of the opening (opening area) of each restrictor (explained later) is uniquely determined by the position of a spool 37a which moves according to control pilot pressures supplied from solenoid-operated proportional pressure-reducing valves 71 and 72. In other direction/flow rate control valves, the opening area of each restrictor is uniquely determined by the position of a spool (of the direction/flow rate control valve) which moves according to an operating signal supplied from an operating device (unshown). In the center bypass cut valve 38, the opening area of each restrictor (explained later) is uniquely determined by the position of a spool 38a which moves according to a control pilot pressure supplied from a solenoid-operated proportional pressure-reducing valve 73. The tank T receives the hydraulic fluid returning from the swing hydraulic motor 27 and other actuators, while also serving as the source of supply of the hydraulic fluid to the hydraulic pump 41. The swing direction/flow rate control valve 37, the center bypass cut valve 38 and the solenoid-operated proportional pressure-reducing valves 71, 72 and 73 form a part of the control valve unit 42.

The hydraulic pump 41 is a variable displacement pump equipped with a regulator 64 for executing torque control. By operating the regulator 64, the tilting angle of the hydraulic pump 41 is changed, the displacement of the hydraulic pump 41 is changed, and consequently, the discharge flow rate of the hydraulic pump 41 is changed. When a torque increasing command from the controller 51 is inputted, the regulator 64 changes the setting of the torque control so as to increase the maximum output torque of the hydraulic pump 41.

The swing operating device 52 (hereinafter referred to simply as an "operating device 52") includes a pressure-reducing valve which reduces pressure supplied from a pilot hydraulic pressure source 29 according to the operation amount of a lever. The operating device 52 outputs operation command pressures corresponding to the operation amount of the lever as operating signals. Pilot hydraulic lines 52a and 52b, to which the operation command pressures as the operating signals are lead, are equipped with pressure sensors 53a and 53b, respectively. Detection signals outputted by the pressure sensors 53a and 53b detecting the operation command pressures are sent to the controller 51. Actuator lines 62a and 62b connecting the swing direction/flow rate control valve 37 and the swing hydraulic motor 27 are equipped with pressure sensors 63a and 63b, respectively. Detection signals outputted by the pressure sensors 63a and 63b detecting meter-in pressure of the swing hydraulic motor 27 (supply pressure on the inlet side of the swing hydraulic motor 27) and meter-out pressure of the swing hydraulic motor 27 (discharge pressure on the outlet side of the swing hydraulic motor 27) are also sent to the controller 51. The controller 51 calculates and outputs control signals to be sent to the solenoid-operated proportional pressure-reducing valves 71, 72 and 73 based on the detection signals. To each of the solenoid-operated proportional pressure-reducing valves 71 and 72, the operation command pressure outputted by the operating device 52 is supplied as primary pressure. Each solenoid-operated proportional pressure-reducing valve 71, 72 reduces the operation command pressure (outputted by the operating device 52) according to the control signal from the controller 51 and outputs the control pilot pressure to a corresponding one of left/right pressure chambers 37b and 37c of the swing direction/flow rate control valve 37. To the solenoid-operated proportional pressure-reducing valve 73, the pressure from the pilot hydraulic pressure source 29 is supplied as primary pressure. The solenoid-operated proportional pressure-reducing valve 73 reduces the pressure from the pilot hydraulic pressure source 29 according to the control signal from the controller 51 and outputs the control pilot pressure to a pressure chamber 38c (one of pressure chambers 38b and 38c) of the center bypass cut valve 38. The other pressure chamber 38b of the center bypass cut valve 38 is connected to the tank T.

The swing direction/flow rate control valve 37 has three positions A, B and C. By receiving the operating signal (operation command pressure) from the operating device 52, the swing direction/flow rate control valve 37 is continuously switched from the position B (neutral position) to the position A or the position C. The swing direction/flow rate control valve 37 includes a bleed-off restrictor 37BO situated on the open center hydraulic line 61 (and thus situated between the hydraulic pump 41 and the tank T), meter-in restrictors 37MIa and 37MIc situated between the hydraulic pump 41 and the swing hydraulic motor 27, and meter-out restrictors 37MOa and 37MOc situated between the swing hydraulic motor 27 and the tank T. The downstream end of the bleed-off restrictor 37BO is connected to the tank T via the open center hydraulic line 61. The downstream ends of the meter-in restrictors 37MIa and 37MIc and the upstream ends of the meter-out restrictors 37MOa and 37MOc are connected to input/output ports of the swing hydraulic motor 27 via actuator lines 62a and 62b. The actuator lines 62a and 62b are equipped with pressure sensors 63a and 63b, respectively. Detection signals outputted by the pressure sensors 63a and 63b are sent to the controller 51 (see FIG. 2).

When the swing direction/flow rate control valve 37 is at the neutral position B, the hydraulic fluid discharged from the hydraulic pump 41 flows through the bleed-off restrictor 37BO and returns to the tank T via the open center hydraulic line 61. When the swing direction/flow rate control valve 37 receiving the operation command pressure corresponding to the lever operation amount of the operating device 52 is switched to the position A, the hydraulic fluid from the hydraulic pump 41 is supplied to one port of the swing hydraulic motor 27 via the meter-in restrictor 37MIa at the position A, and returning hydraulic fluid from the swing hydraulic motor 27 returns to the tank T via the meter-out restrictor 37MOa at the position A. By the movement of the hydraulic fluid, the swing hydraulic motor 27 is rotated in one direction. In contrast, when the swing direction/flow rate control valve 37 receiving the operation command pressure corresponding to the lever operation amount of the operating device 52 is switched to the position C, the hydraulic fluid from the hydraulic pump 41 is supplied to the other port of the swing hydraulic motor 27 via the meter-in restrictor 37MIc at the position C, and returning hydraulic fluid from the swing hydraulic motor 27 returns to the tank T via the meter-out restrictor 37MOc at the position C. By the movement of the hydraulic fluid, the swing hydraulic motor 27 is rotated in the reverse direction compared to the case of the position A.

When the swing direction/flow rate control valve 37 is situated at an intermediate position between the neutral position B and the position A, the hydraulic fluid from the hydraulic pump 41 is distributed to the bleed-off restrictor 37BO and the meter-in restrictor 37MIa. In this case, a pressure corresponding to the opening area of the bleed-off restrictor 37BO develops on the inlet side of the meter-in restrictor 37MIa, by which the hydraulic fluid is supplied to the swing hydraulic motor 27 and drive torque (acceleration torque) corresponding to the pressure (i.e., corresponding to the opening area of the bleed-off restrictor 37BO) is given to the swing hydraulic motor 27. Meanwhile, the hydraulic fluid discharged from the swing hydraulic motor 27 receives resistance corresponding to the opening area of the meter-out restrictor 37MOa at that time (back pressure), causing braking torque corresponding to the opening area of the meter-out restrictor 37MOa. Operation when the swing direction/flow rate control valve 37 is situated at an intermediate position between the neutral position B and the position C is similar to the above operation, and thus repeated explanation thereof is omitted for brevity.

The center bypass cut valve 38, receiving the control pilot pressure from the solenoid-operated proportional pressure-reducing valve 73, is switched from its position B (neutral position) to a certain position between the position B and a position C. The center bypass cut valve 38 has a bleed-off restrictor 38BO situated on the open center hydraulic line 61 (and thus situated between the hydraulic pump 41 and the tank T). When the center bypass cut valve 38 is at the neutral position B, the opening area of the bleed-off restrictor 38BO is at the maximum. The opening area of the bleed-off restrictor 38BO decreases when the center bypass cut valve 38, receiving the control pilot pressure from the solenoid-operated proportional pressure-reducing valve 73, is switched to a certain position between the positions B and C. With the decrease in the opening area, pressures on the inlet sides of the bleed-off restrictor 37BO and the meter-in restrictor 37MIa of the swing direction/flow rate control valve 37 increase, and correspondingly, the drive torque (acceleration torque) of the swing hydraulic motor 27 increases.

<Opening Area Characteristic>

Figure 4:
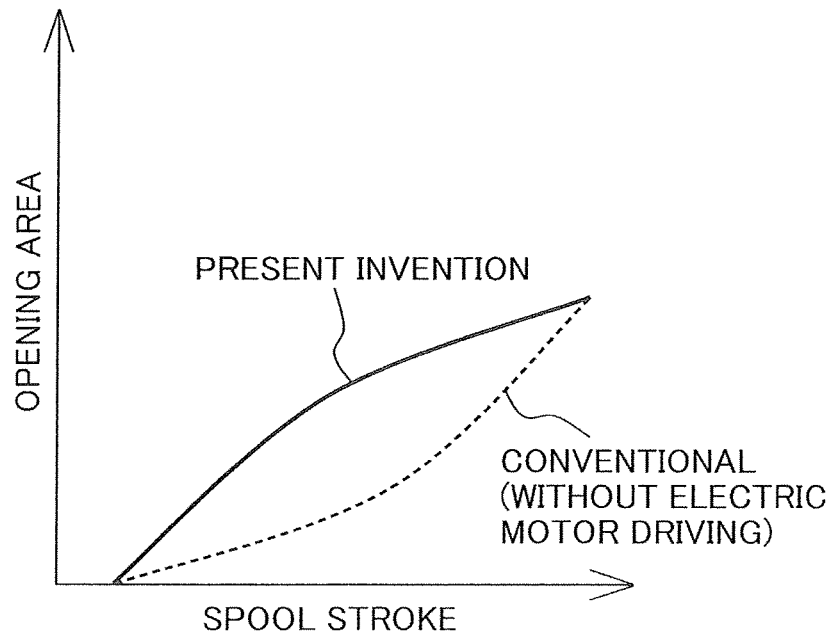
FIG. 4 is a graph showing an opening area characteristic of a meter-out restrictor of a swing direction/flow rate control valve with respect to a spool stroke.

FIG. 4 shows an opening area characteristic of the meter-out restrictor of the swing direction/flow rate control valve 37 with respect to the spool stroke. In FIG. 4, the solid line represents an opening area characteristic of the meter-out restrictor (37MOa, 37MOc) of the swing direction/flow rate control valve 37 in this embodiment, while the broken line represents an opening area characteristic of a meter-out restrictor of a swing direction/flow rate control valve capable of securing satisfactory operability in a conventional hydraulic shovel (employing no electric motor for the swinging) by the hydraulic solo driving. As shown in FIG. 4, the meter-out restrictor (37MOa, 37MOc) of the swing direction/flow rate control valve 37 in this embodiment is designed so that the opening areas at the starting point and the end point of the control zone coincide with those in the conventional hydraulic shovel but the opening areas in the intermediate zone (between the starting point and the end point) are larger than those in the conventional hydraulic shovel. Thus, the opening area characteristic of the meter-out restrictor (37MOa, 37MOc) of the swing direction/flow rate control valve 37 is set so that the opening area of the meter-out restrictor of the direction/flow rate control valve 37 is larger than the opening area of the direction/flow rate control valve prescribed for the conventional construction machine (hydraulic shovel) which drives the upper swing structure 20 with the swing hydraulic motor 27 alone (broken line in FIG. 4).

Figure 5:
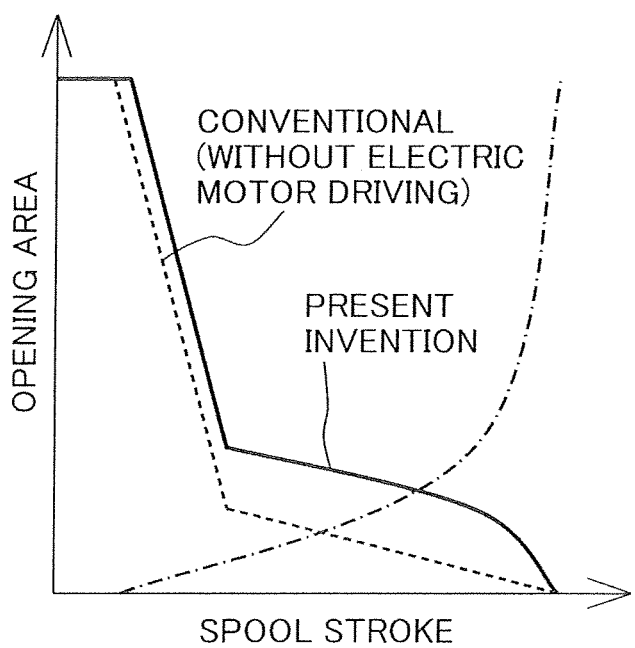
FIG. 5 is a graph showing opening area characteristics of a meter-in restrictor and a bleed-off restrictor of the swing direction/flow rate control valve with respect to the spool stroke.

FIG. 5 shows opening area characteristics of the meter-in restrictor and the bleed-off restrictor of the swing direction/flow rate control valve 37 with respect to the spool stroke. In FIG. 5, the solid line represents an opening area characteristic of the bleed-off restrictor 37BO of the swing direction/flow rate control valve 37 in this embodiment, while the broken line represents an opening area characteristic of a bleed-off restrictor of a swing direction/flow rate control valve capable of securing satisfactory operability in the conventional hydraulic shovel (employing no electric motor for the swinging) by the hydraulic solo driving. A chain line represents an opening area characteristic of the meter-in restrictor (37MIa, 37MIc) of the swing direction/flow rate control valve 37 in this embodiment, which is identical with that in the conventional hydraulic shovel. As shown in FIG. 5, the bleed-off restrictor 37BO of the swing direction/flow rate control valve 37 in this embodiment is designed so that the opening areas at the starting point and the end point of the control zone coincide with those in the conventional hydraulic shovel but the opening areas in the intermediate zone are larger than those in the conventional hydraulic shovel. Thus, the opening area characteristic of the bleed-off restrictor 37BO of the swing direction/flow rate control valve 37 is set so that the opening area of the bleed-off restrictor of the swing direction/flow rate control valve 37 is larger than the opening area of the direction/flow rate control valve prescribed for the conventional construction machine (hydraulic shovel) which drives the upper swing structure 20 with the swing hydraulic motor 27 alone (broken line in FIG. 5). The opening area characteristic of the meter-in restrictor in this embodiment is set to be identical with that in the conventional hydraulic shovel.

Figure 6:
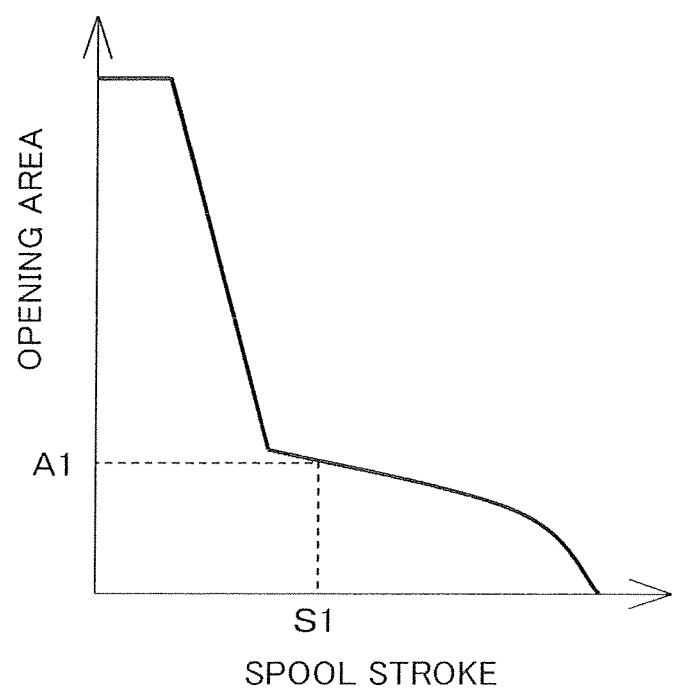
FIG. 6 is a graph showing an opening area characteristic of a bleed-off restrictor of a center bypass cut valve with respect to the spool stroke.

FIG. 6 shows an opening area characteristic of the bleed-off restrictor 38BO of the center bypass cut valve 38 with respect to the spool stroke. This example is of a case where the center bypass cut valve 38 is implemented by using a spare spool that is generally included in the control valve unit 42. When the control pilot pressure from the solenoid-operated proportional pressure-reducing valve 73 is supplied, the spool stroke of the center bypass cut valve 38 reaches S1 shown in FIG. 6 and the opening area of the center bypass restrictor 38BO decreases from its maximum value to A1. In short, the center bypass cut valve 38 is switched from its full-open position to the position corresponding to the restrictor opening area A1. Incidentally, the opening area characteristic of the center bypass cut valve 38 may be set differently as long as the opening area reaches A1 when the center bypass cut valve 38 is at the position corresponding to the control pilot pressure.

<Control Principles>

Next, processing functions of the controller 51 will be described below.

First, control principles of the controller 51 will be explained.

In normal operation, the driving/swinging of the upper swing structure 20 is conducted by driving both the swing electric motor 25 and the swing hydraulic motor 27 (hereinafter referred to as a "hydraulic/electric combined swing mode"). In this case, the controller 51 does not output the control signals to the solenoid-operated proportional pressure-reducing valves 71, 72 and 73. Therefore, the operation command pressure outputted by the operating device 52 is inputted to the pressure chamber 37b or 37c of the swing direction/flow rate control valve 37 directly (without being reduced) and drives the spool 37a of the swing direction/flow rate control valve 37. Meanwhile, the center bypass cut valve 38 remains at the neutral position B since no control pilot pressure is inputted to the pressure chamber 38c.

In contrast, when the swing electric motor 25 is stopped (not driven) due to failure of the swing electric motor 25, voltage abnormality of the battery 24, etc. and the upper swing structure 20 is driven with the swing hydraulic motor 27 alone (hereinafter referred to as a "hydraulic solo swing mode"), output torque for driving the upper swing structure 20 (hereinafter referred to as "swing output torque" or "swing torque" as needed) decreases by the torque that has been outputted by the swing electric motor 25 in the normal operation. In order to compensate for the decrease in the swing output torque, the controller 51 in the present invention executes control so as to increase output torque of the swing hydraulic motor 27. For increasing the output torque of the swing hydraulic motor 27, the controller 51 controls the hydraulic circuit system 40 so that either the meter-in pressure or the meter-out pressure of the swing hydraulic motor 27 increases.

For example, when the swing electric motor 25 is not driven, the controller 51 executes control to increase the braking torque of the swing hydraulic motor 27 by increasing the meter-out pressure of the swing hydraulic motor 27 by controlling the meter-out restrictor 37MOa or 37MOc of the direction/flow rate control valve 37 in its closing direction. Further, when the swing electric motor 25 is not driven, the controller 51 executes control to increase the drive torque of the swing hydraulic motor 27 by increasing the meter-in pressure of the swing hydraulic motor 27 by controlling the center bypass cut valve 38 to narrow the open center hydraulic line 61 by use of a composite restrictor made up of the bleed-off restrictor 37BO of the direction/flow rate control valve 37 and the bleed-off restrictor 38BO of the center bypass cut valve 38 (auxiliary valve). Furthermore, when the swing electric motor 25 is not driven, the controller 51 executes control to increase output torque of the hydraulic pump 41 in order to increase the output of the swing hydraulic motor 27.

When the swing electric motor 25 is not driven, the controller 51 increases the output of the swing hydraulic motor 27 by controlling the hydraulic circuit system 40 (specifically, the swing direction/flow rate control valve 37, the center bypass cut valve 38 and the regulator 64) based on the above ideas.

<Processing Functions of Controller>

Next, the processing functions of the controller 51 executing the above control will be described concretely referring to FIGS. 7-9.

Figure 7:
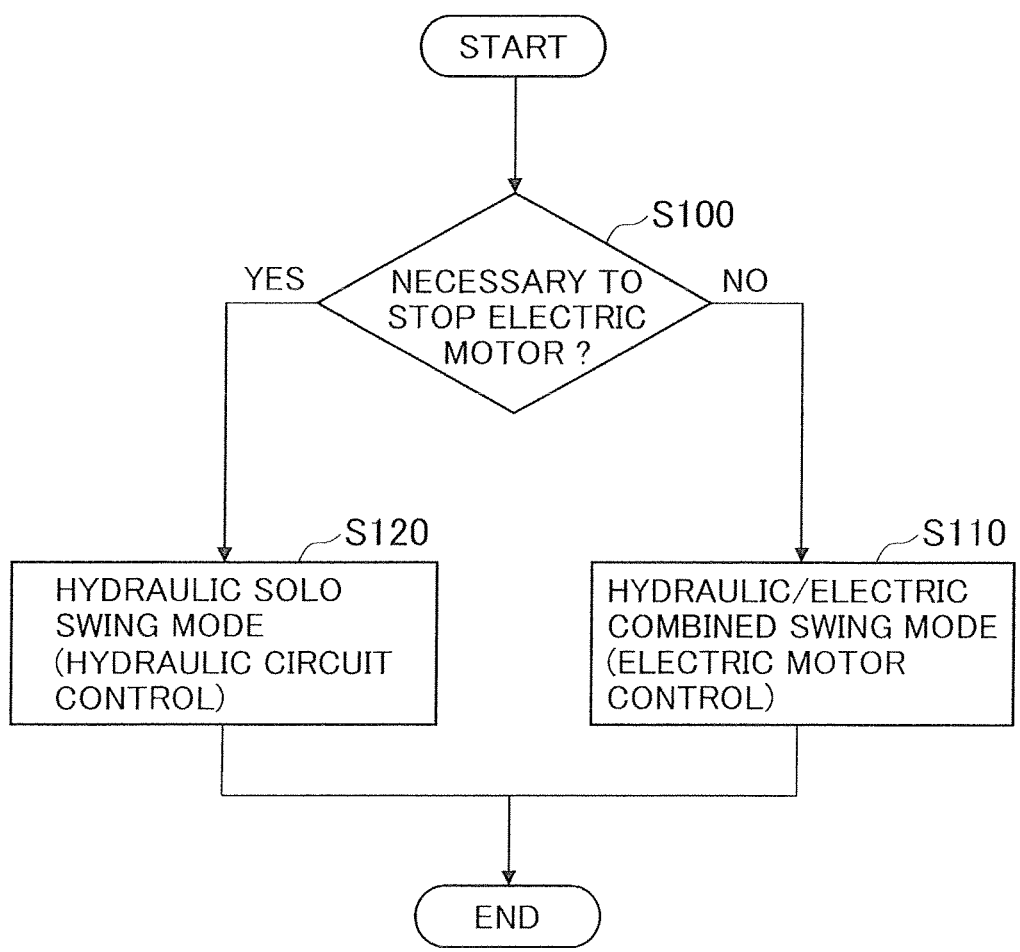
FIG. 7 is a flow chart showing control functions of a controller.

FIG. 7 is a flow chart showing overall processing functions of the controller 51.

First, the controller 51 judges whether the need of stopping the swing electric motor 25 has arisen or not (step S100). Examples of cases where the need of stopping the swing electric motor 25 has arisen may include voltage abnormality (e.g., low voltage) of the battery 24 in the electric system of the swing electric motor 25 shown in FIG. 2, occurrence of other failure, abnormality or warning state of electric equipment, etc. The controller 51 acquires internal information from the battery 24, the swing electric motor 25 and the inverter/converter 28 and judges whether the failure, abnormality or warning state has occurred or not based on the acquired information.

When the need of stopping the swing electric motor 25 has not arisen in the step S100, the controller 51 selects the hydraulic/electric combined swing mode and executes torque control of the swing electric motor 25 via the inverter/converter 28 (step S110). In this case, the upper swing structure 20 is driven by both the swing electric motor 25 and the swing hydraulic motor 27.

The torque control of the swing electric motor 25 can be executed as follows, for example: The output torque (braking torque, acceleration torque) of the swing electric motor 25 is predetermined and preset to the controller 51 as a function of the operation command pressure (operating signal) outputted by the operating device 52. The controller 51 determines target torque by referring to the function using the operation command pressure at that time and controls the swing electric motor 25 so as to achieve the target torque. In this case, it is desirable that the torque of the swing electric motor 25 be controlled so that the total sum of output torque occurring in the swing hydraulic motor 27 and the output torque of the swing electric motor 25 becomes equal to the output torque of the swing hydraulic motor in the conventional construction machine (hydraulic shovel) driving the upper swing structure 20 with the swing hydraulic motor 27 alone. With such control, the braking torque in the deceleration of the swinging of the upper swing structure 20 and the acceleration torque in the acceleration of the swinging of the upper swing structure 20 become equal to those in the construction machines driving the upper swing structure 20 with the hydraulic motor alone. Consequently, a satisfactory operational feeling equivalent to that in the construction machines driving the upper swing structure 20 with the hydraulic motor alone can be secured in the deceleration and acceleration of the swinging of the upper swing structure 20.

In contrast, when the need of stopping the swing electric motor 25 has arisen in the step S100, the controller 51 switches the swing mode from the hydraulic/electric combined swing mode to the hydraulic solo swing mode, stops the torque control of the swing electric motor 25, and executes output increasing control for the swing hydraulic system (step S120).

Figure 8:
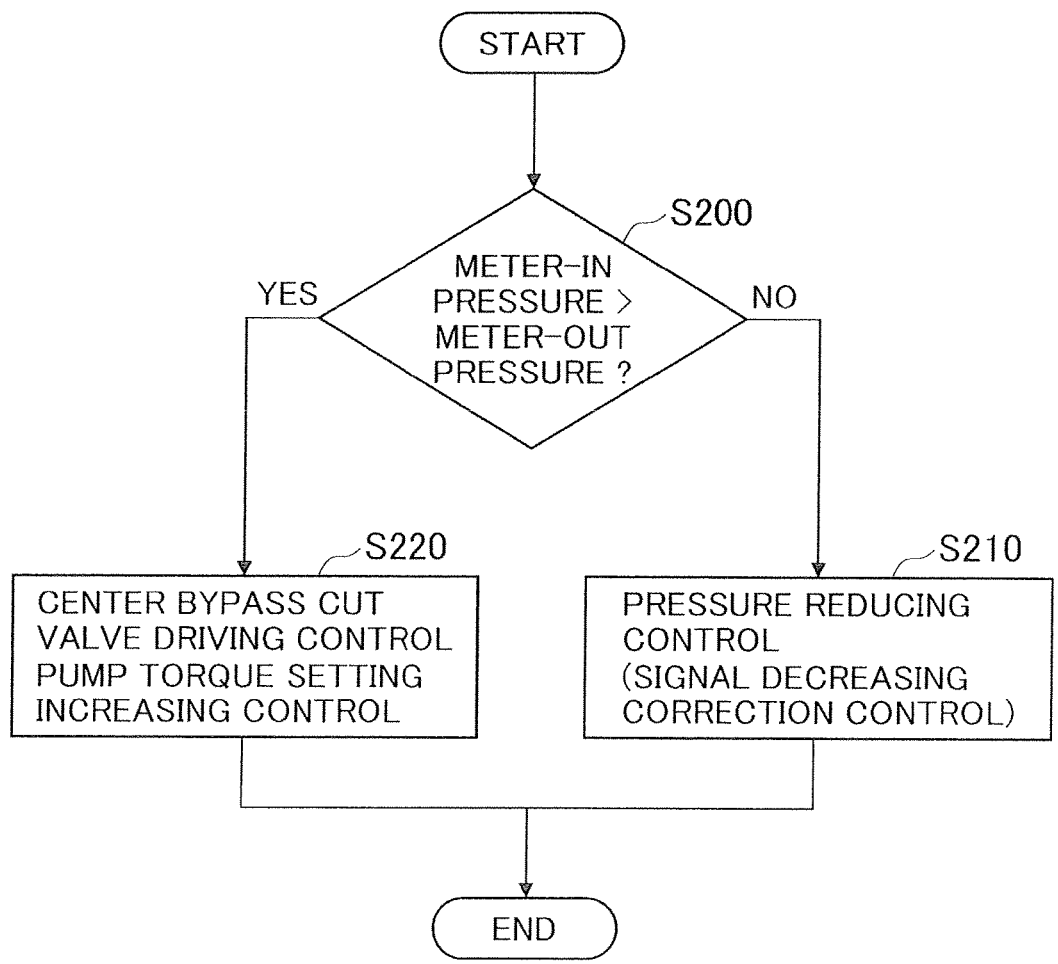
FIG. 8 is a flow chart showing the contents of processing in a hydraulic solo swing mode.

FIG. 8 is a flow chart showing the contents of the processing in the hydraulic solo swing mode (step S120).

The controller 51 acquires information on the actual measurement values of the meter-in pressure and the meter-out pressure from the pressure sensors 63a and 63b and judges whether the meter-in pressure is higher than the meter-out pressure (step S200). When the meter-in pressure is higher than the meter-out pressure, the swing hydraulic motor 27 is in acceleration (driving), otherwise the swing hydraulic motor 27 is in braking (deceleration). In the case where the meter-in pressure is not higher than the meter-out pressure (in the braking of the swing hydraulic motor 27), the controller 51 executes pressure reducing control (operating signal decreasing correction control) to the operation command pressure of the operating device 52 inputted from the pressure sensor (53*a*, 53*b*) (step S210). In the other case where the meter-in pressure is higher than the meter-out pressure (in the acceleration of the swing hydraulic motor 27), the controller 51 executes driving control of the center bypass cut valve 38 and torque control setting increasing control of the regulator 64 (step S220).

Figure 9:
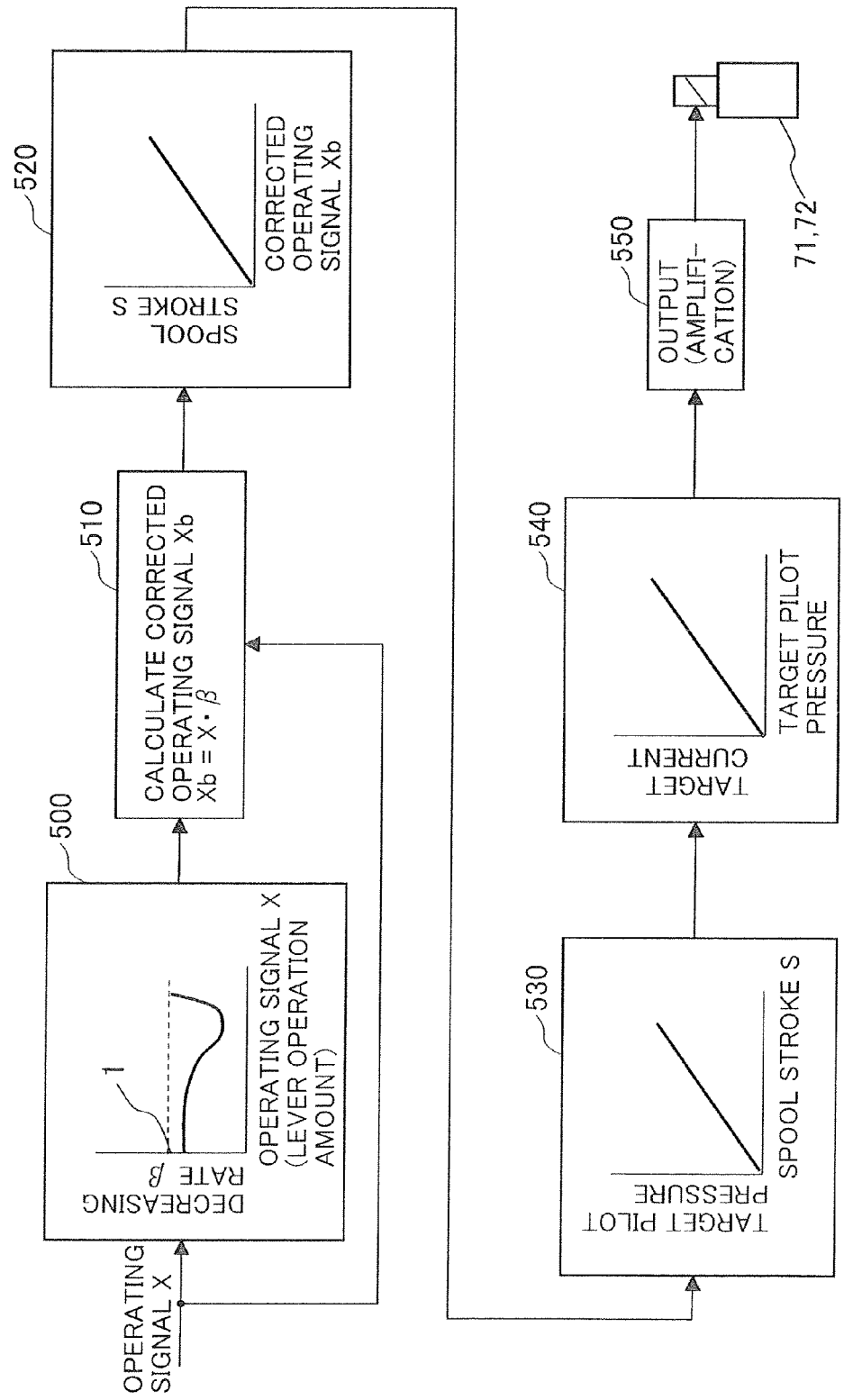
FIG. 9 is a functional block diagram showing the details of pressure reducing control which is executed in the hydraulic solo swing mode.

FIG. 9 is a functional block diagram showing the details of the pressure reducing control executed in the step S210. For the pressure reducing control function, the controller 51 includes a decreasing rate calculation unit 500, a corrected operating signal calculation unit 510, a spool stroke calculation unit 520, a target pilot pressure calculation unit 530, a target current calculation unit 540 and an output unit 550.

The decreasing rate calculation unit 500 receives a signal indicating the operation command pressure of the operating device 52 (hereinafter referred to as an "operating signal X") from the pressure sensor (53*a*, 53*b*) and calculates a decreasing rate β (numerical value≤1) for the decreasing correction control of the operating signal X by referring to a table that specifies a preset functional relationship between the operating signal X and the decreasing rate β. The functional relationship between the operating signal X and the decreasing rate β has been set so that the opening area of the meter-out restrictor (37MOa, 37MOc) (when the opening area characteristic of the swing direction/flow rate control valve 37 is considered in terms of an opening area characteristic with respect to the lever operation amount of the operating device 52) decreases compared to the case where the pressure reducing control is not executed and the braking torque of the swing hydraulic motor 27 becomes equivalent to that in the hydraulic/electric combined swing mode. In other words, the functional relationship between the operating signal X and the decreasing rate β has been set so that the opening area of the meter-out restrictor 37MOa or 37MOc decreases to a value equivalent to that of the swing direction/flow rate control valve in the construction machines driving the upper swing structure 20 with the hydraulic motor alone.

The corrected operating signal calculation unit 510 calculates a corrected operating signal Xb by multiplying the operating signal X of the operating device 52 by the decreasing rate β.

The spool stroke calculation unit 520 converts the corrected operating signal Xb calculated by the corrected operating signal calculation unit 510 into a spool stroke S. The target pilot pressure calculation unit 530 converts the spool stroke S into a target pilot pressure. The target current calculation unit 540 converts the target pilot pressure into a target current for driving the solenoid-operated proportional pressure-reducing valve 71 or 72. The output unit 550 amplifies the target current and outputs the amplified target current to the solenoid-operated proportional pressure-reducing valve 71 or 72. The processes executed by the components from the spool stroke calculation unit 520 are identical with processes executed by a controller of a conventional system equipped with an operating device outputting an electric signal.

Figure 10:
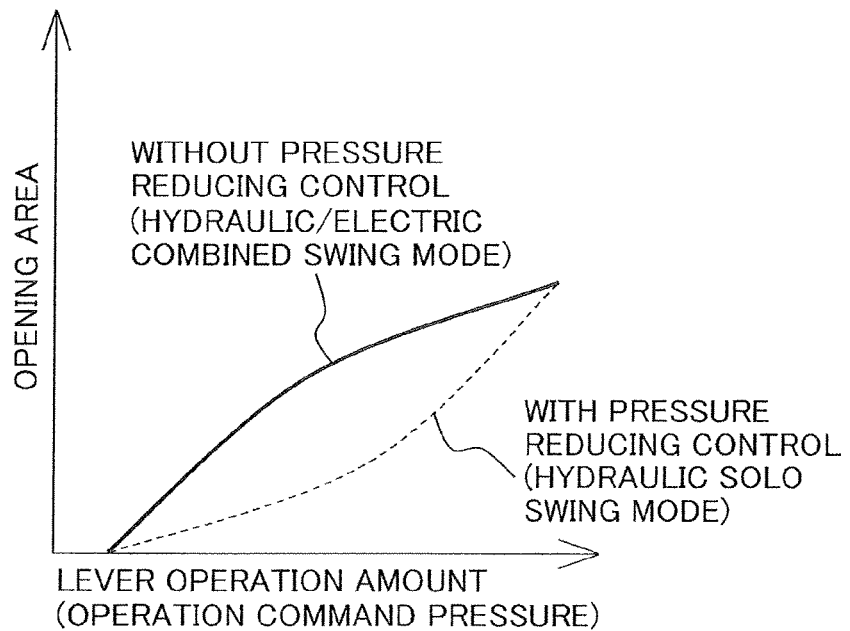
FIG. 10 is a graph showing the change in the opening area of the meter-out restrictor of the swing direction/flow rate control valve with respect to a lever operation amount (operation command pressure) of an operating device when the pressure reducing control is executed to the operation command pressure of the operating device.

FIG. 10 is a graph showing the change in the opening area of the meter-out restrictor (37MOa, 37MOc) of the swing direction/flow rate control valve 37 with respect to the lever operation amount (operation command pressure) of the operating device 52 when the pressure reducing control is executed to the operation command pressure of the operating device 52 as above. In FIG. 10, the solid line represents a case where the pressure reducing control is not executed to the operation command pressure (hydraulic/electric combined swing mode) and the broken line represents a case where the pressure reducing control is executed to the operation command pressure (hydraulic solo swing mode). As is clear from FIG. 10, when the pressure reducing control is executed to the operation command pressure, the opening area of the meter-out restrictor (37MOa, 37MOc) (considered in terms of an opening area characteristic with respect to the lever operation amount of the operating device 52) is corrected to be smaller compared to the case where the pressure reducing control is not executed to the operation command pressure. Consequently, the meter-out pressure of the swing hydraulic motor 27 (discharge pressure on the outlet side of the swing hydraulic motor 27) can be increased in operation of the swing hydraulic motor 27, by which the braking torque of the swing hydraulic motor 27 can be increased and the braking force of the upper swing structure 20 can be enhanced. In short, the output torque of the swing hydraulic motor 27 can be increased.

Returning to FIG. 8, in the driving control of the center bypass cut valve 38 (step S220), the controller 51 outputs the control signal to the solenoid-operated proportional pressure-reducing valve 73. The solenoid-operated proportional pressure-reducing valve 73 outputs control pilot pressure corresponding to the control signal to the pressure chamber 38*c* of the center bypass cut valve 38, by which the opening area of the center bypass restrictor 38BO is decreased from the maximum opening area to A1 (see FIG. 6). Meanwhile, in the torque control setting increasing control of the regulator 64, the controller 51 outputs the torque increasing command and thereby increases the torque control setting of the regulator 64.

Figure 11:
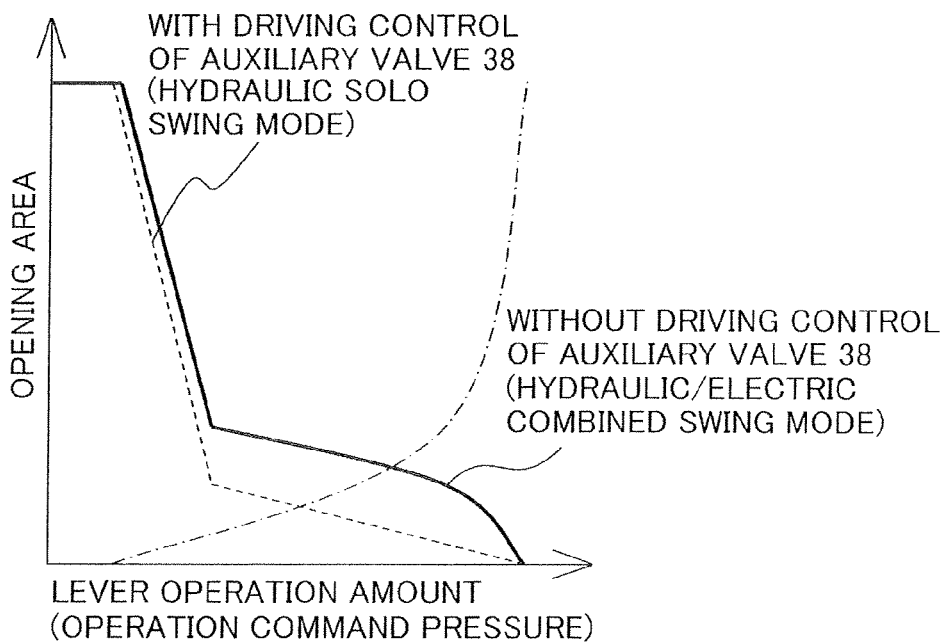
FIG. 11 is a graph showing the change in a composite opening area of the bleed-off restrictor of the swing direction/flow rate control valve and the bleed-off restrictor of the center bypass cut valve with respect to the lever operation amount (operation command pressure) of the operating device when driving control of the center bypass cut valve is executed.

FIG. 11 is a graph showing the change in the composite opening area of the bleed-off restrictor 37BO of the swing direction/flow rate control valve 37 and the bleed-off restrictor 38BO of the center bypass cut valve 38 with respect to the lever operation amount (operation command pressure) of the operating device 52 when the driving control of the center bypass cut valve 38 is executed as above. In FIG. 11, the solid line represents a case where the driving control of the center bypass cut valve 38 is not executed (hydraulic/electric combined swing mode) and the broken line represents a case where the driving control of the center bypass cut valve 38 is executed (hydraulic solo swing mode).

Figure 12:
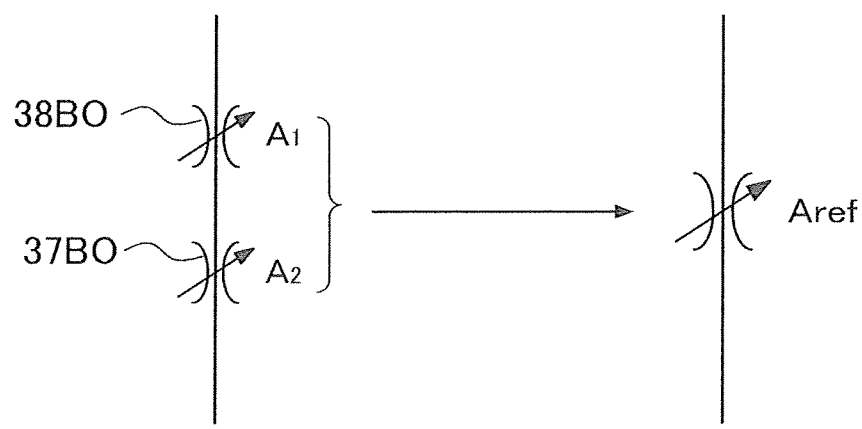
FIG. 12 is a schematic diagram showing the concept of the composite bleed-off opening area shown in FIG. 11.

FIG. 12 is a schematic diagram showing the concept of the composite bleed-off opening area shown in FIG. 11. The bleed-off restrictor 38BO of the center bypass cut valve 38 and the bleed-off restrictor 37BO of the swing direction/flow rate control valve 37 can be replaced with a composite restrictor having a bleed-off opening area Aref. Let the aforementioned "A1" represent the opening area of the bleed-off restrictor 38BO of the center bypass cut valve 38 and "A2" represent the opening area of the bleed-off restrictor 37BO of the swing direction/flow rate control valve 37, the relationship among A1, A2 and Aref can be expressed as follows:

$$Aref = A1 \cdot A2 / \sqrt{(A1^2 + A2^2)}$$

As is clear from FIG. 11, when the driving control of the center bypass cut valve 38 is executed, the composite opening area considered in terms of the opening area characteristic with respect to the lever operation amount of the operating device 52 is corrected to be smaller than the opening area in the case without the driving control of the center bypass cut valve 38. Consequently, the discharge pressure of the hydraulic pump 41 can be increased in operation of the swing hydraulic motor 27, by which the meter-in pressure of the swing hydraulic motor 27 (supply pressure on the inlet side of the swing hydraulic motor 27) can be increased, the drive torque (acceleration torque) of the swing hydraulic motor 27 can be increased, and the driving force (accelerating force) of the upper swing structure 20 can be enhanced. In short, the output torque of the swing hydraulic motor 27 can be increased.

The opening areas shown in FIGS. 10 and 11 in the case with the pressure reducing control of the command pilot pressure and the driving control of the center bypass cut valve 38 may either be prestored in a memory of the controller 51 as an opening area characteristic that is capable of achieving output equivalent to that in the case with the driving of the swing electric motor 25, or be determined by a computational method.

Figure 13:
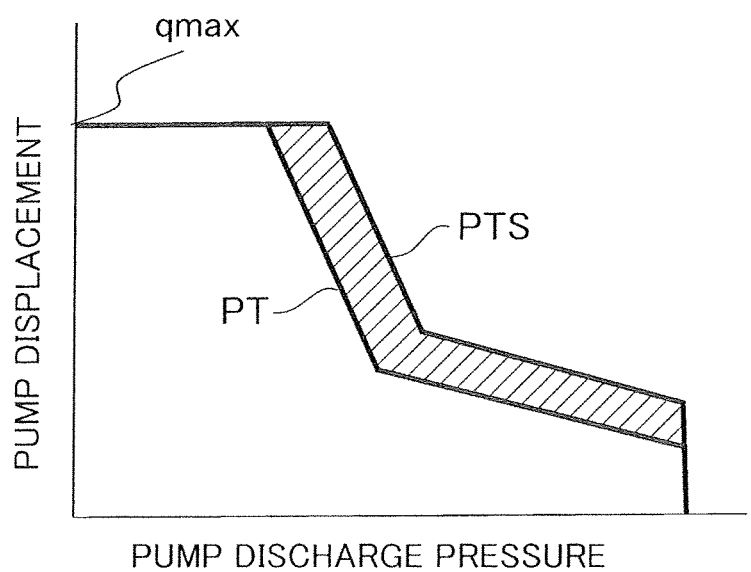
FIG. 13 is a graph showing the change in a torque control characteristic of a hydraulic pump when a torque control setting of a regulator is increased.

FIG. 13 is a graph showing the change in a torque control characteristic of the hydraulic pump 41 when the torque control setting of the regulator 64 is increased as above, wherein the horizontal axis represents the discharge pressure of the hydraulic pump 41 and the vertical axis represents the displacement of the hydraulic pump 41.

In the hydraulic/electric combined swing mode in the normal operation, the torque control setting of the regulator 64 is not changed and remains in the characteristic indicated by the solid line PT in FIG. 13. When the swing electric motor 25 is stopped and the swing mode is switched to the hydraulic solo swing mode, the controller 51 outputs the torque increasing command and thereby changes the torque control setting of the regulator 64 from the characteristic of the solid line PT to the characteristic of the solid line PTS in FIG. 13. Consequently, the maximum output torque of the hydraulic pump 41 increases by an amount corresponding to the hatched area in FIG. 13 and the hydraulic pump 41 is enabled to supply hydraulic torque necessary for raising the meter-in pressure of the swing hydraulic motor 27 and increasing the acceleration torque of the swing hydraulic motor 27 when the driving control of the center bypass cut valve 38 is executed in the hydraulic solo swing mode.

<Time-line Waveforms of Control>

Figure 14:
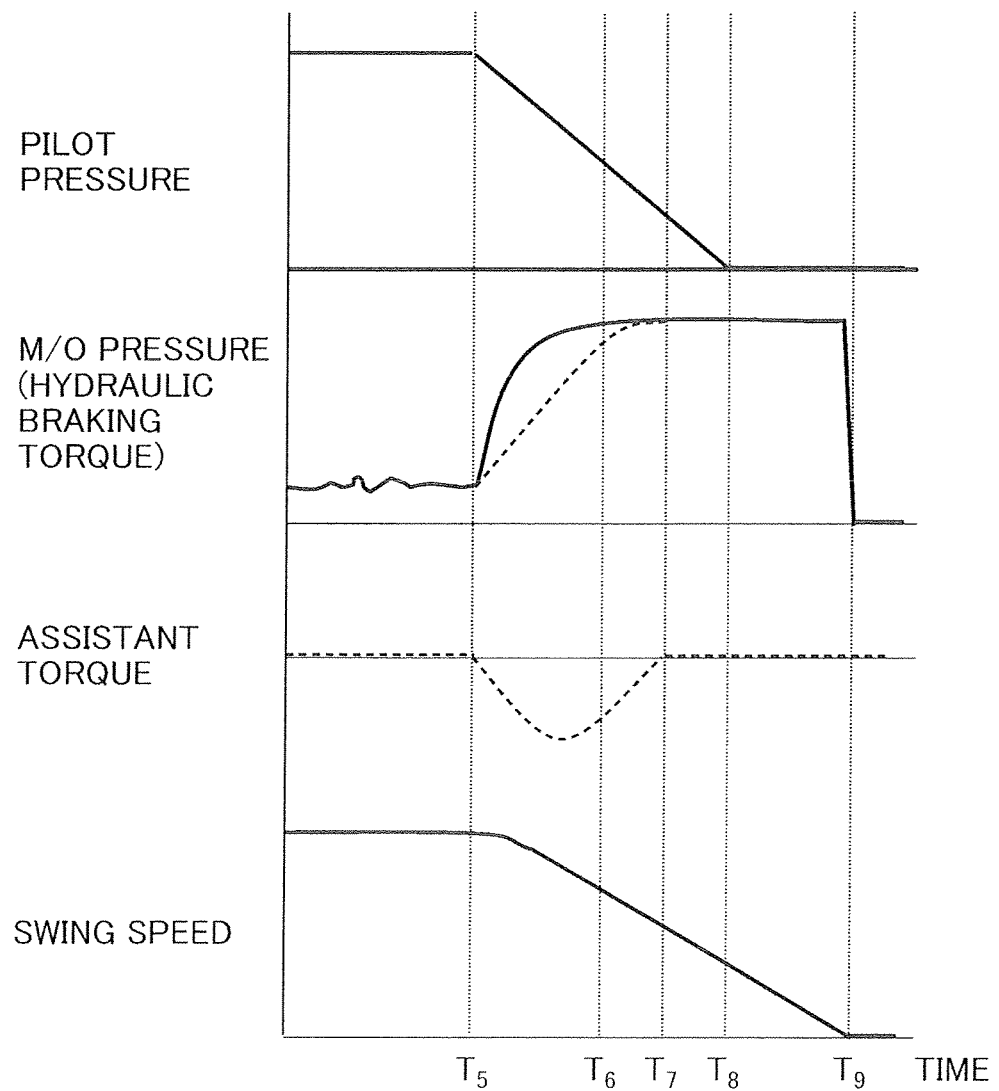
FIG. 14 is a graph showing time-line waveforms of the operation command pressure (pilot pressure) of the operating device, meter-out pressure (M/O pressure), assistant torque of a swing electric motor and revolution speed (swing speed) of an upper swing structure in braking/stopping of the swinging of the upper swing structure.

FIG. 14 is a graph showing time-line waveforms of the operation command pressure (pilot pressure) of the operating device 52, the meter-out pressure (M/O pressure), assistant torque of the swing electric motor 25 and the revolution speed (swing speed) of the upper swing structure 20 in the braking/stopping of the swinging of the upper swing structure 20. The operation command pressure (pilot pressure), initially at the maximum level corresponding to the maximum swing speed, was reduced with time (T=T5–T8) gradually (in a ramp-like shape) down to 0.

When the hydraulic/electric combined swing mode has been selected, the meter-out pressure (M/O pressure) of the swing hydraulic motor 27 in this embodiment (broken line) is lower than that in the conventional hydraulic shovel since the meter-out restrictor (37MOa, 37MOc) of the swing direction/flow rate control valve 37 is designed to have an opening area larger than that in the conventional hydraulic shovel. Since the difference in the meter-out pressure directly corresponds to the difference in the braking torque, the torque of the swing hydraulic motor 27 (hydraulic motor torque) in this embodiment is lower in the absolute value than that in the case of employing the opening area capable of securing satisfactory operability in the conventional hydraulic shovel by the hydraulic solo driving. In this embodiment, braking torque corresponding to the difference in the hydraulic motor torque is provided by the swing electric motor 25. In FIG. 14, the negative assistant torque means assistant torque on the regeneration side. Since the total sum of the assistant torque of the swing electric motor 25 and the braking torque deriving from the meter-out pressure caused by the swing direction/flow rate control valve 37 is controlled to be substantially equal to the braking torque occurring in the conventional hydraulic shovel, the swing speed of the upper swing structure 20 is allowed to give a deceleration feeling equivalent to that in the conventional hydraulic shovel.

In contrast, when the hydraulic solo swing mode is selected, the meter-out opening area characteristic of the swing direction/flow rate control valve 37 with respect to the operation command pressure (lever operation amount) is changed by the pressure reducing control to a characteristic with decreased opening areas in the intermediate zone as indicated by the broken line in FIG. 10. Thus, the meter-out pressure caused by the swing direction/flow rate control valve 37 increases to that indicated by the solid line in FIG. 14 and the braking torque deriving from the meter-out pressure caused by the swing direction/flow rate control valve 37 is controlled to be substantially equal to the braking torque occurring in the hydraulic/electric combined swing mode. Consequently, the swing speed of the upper swing structure 20 is allowed to give a deceleration feeling equivalent to that in the hydraulic/electric combined swing mode.

Figure 15:
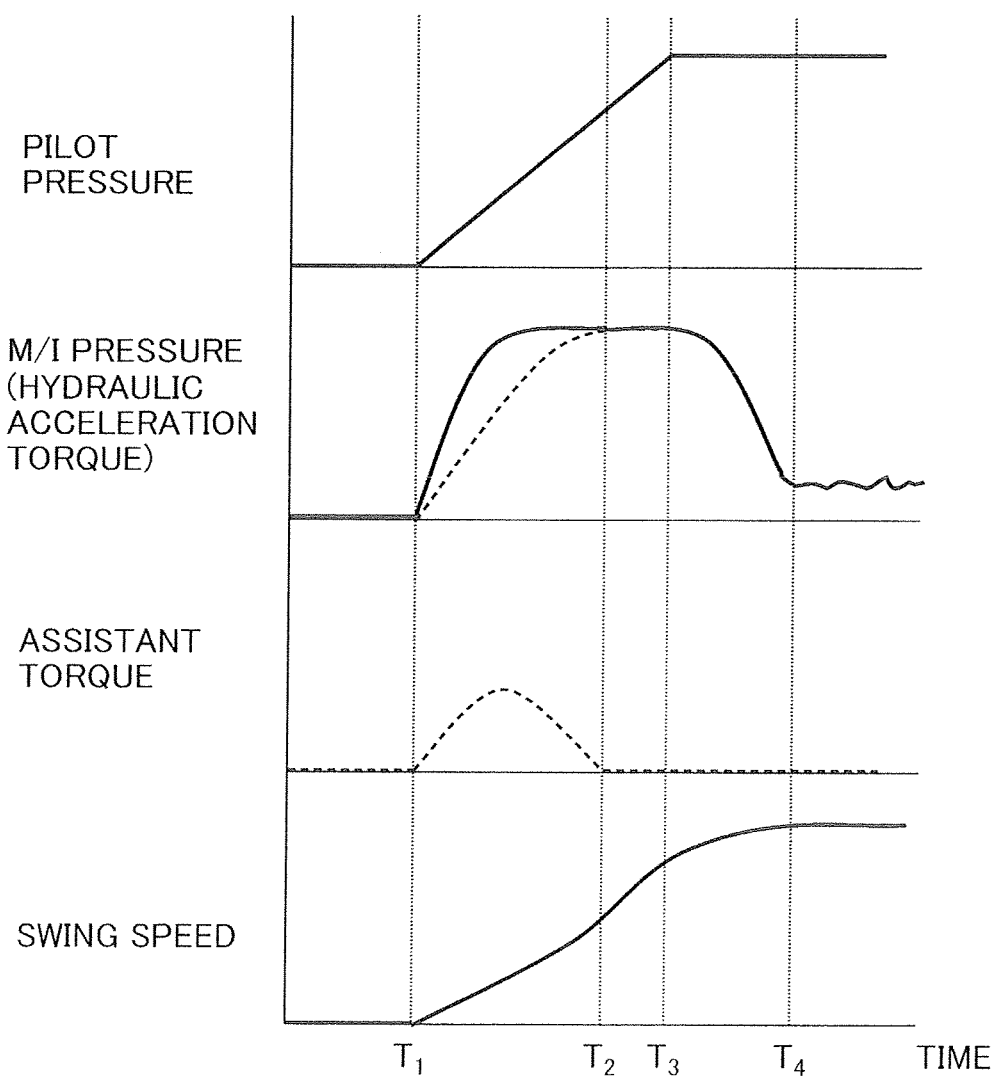
FIG. 15 is a graph showing time-line waveforms of the operation command pressure (pilot pressure) of the operating device, meter-in pressure (M/I pressure), the assistant torque of the swing electric motor and the revolution speed (swing speed) of the upper swing structure in driving (acceleration) of the swinging of the upper swing structure.

FIG. 15 is a graph showing time-line waveforms of the operation command pressure (pilot pressure) of the operating device 52, the meter-in pressure (M/I pressure), the assistant torque of the swing electric motor 25 and the revolution speed (swing speed) of the upper swing structure 20 in the driving (acceleration) of the swinging of the upper swing structure 20. The operation command pressure (pilot pressure), initially at 0 corresponding to the swing-stopped state, was increased with time (T=T1–T3) gradually (in a ramp-like shape) up to the maximum level.

When the hydraulic/electric combined swing mode has been selected, the meter-in pressure (M/I pressure) of the swing hydraulic motor 27 in this embodiment (broken line) is lower than that in the conventional hydraulic shovel since the bleed-off restrictor 37BO of the swing direction/flow rate control valve 37 is designed to have an opening area larger than that in the conventional hydraulic shovel. Since the difference in the meter-in pressure directly corresponds to the difference in the acceleration torque, the torque of the swing hydraulic motor 27 (hydraulic motor torque) in this embodiment is lower in the absolute value than that in the case of employing the opening area capable of securing satisfactory operability in the conventional hydraulic shovel by the hydraulic solo driving. In this embodiment, acceleration torque corresponding to the difference in the hydraulic motor torque is provided by the swing electric motor 25. In FIG. 15, the positive assistant torque means assistant torque on the power running side. Since the total sum of the assistant torque of the swing electric motor 25 and the acceleration torque deriving from the meter-in pressure caused by the swing direction/flow rate control valve 37 is controlled to be substantially equal to the acceleration torque occurring in the conventional hydraulic shovel, the swing speed of the upper swing structure 20 is allowed to give an acceleration feeling equivalent to that in the conventional hydraulic shovel.

In contrast, when the hydraulic solo swing mode is selected, the composite opening area characteristic of the bleed-off restrictor 37BO of the swing direction/flow rate control valve 37 and the bleed-off restrictor 38BO of the center bypass cut valve 38 is changed to a characteristic with decreased opening areas as indicated by the broken line in FIG. 11. Thus, the meter-in pressure caused by the swing direction/flow rate control valve 37 increases to that indicated by the solid line in FIG. 15 and the acceleration torque deriving from the meter-in pressure caused by the swing direction/flow rate control valve 37 is controlled to be substantially equal to the acceleration torque occurring in the hydraulic/electric combined swing mode. Consequently, the swing speed of the upper swing structure 20 is allowed to give an acceleration feeling equivalent to that in the conventional hydraulic shovel.

<Advantages>

According to this embodiment configured as above, the upper swing structure 20 is driven by using the swing hydraulic motor 27 and the swing electric motor 25 together. Therefore, the energy of the upper swing structure 20 in deceleration or stopping can be regenerated by the swing electric motor 25 into electric power and the regenerated electric power can be used by the swing electric motor 25 for assisting the driving of the upper swing structure 20.

Further, when the swing electric motor 25 is not driven, the hydraulic circuit system 40 (specifically, the swing direction/flow rate control valve 37, the center bypass cut valve 38 and the regulator 64) is controlled so as to increase the output torque of the swing hydraulic motor 27 (compared to the case where the swing electric motor 25 is driven) by the amount corresponding to torque to be compensated for the non-driving of the swing electric motor 25. Therefore, the drop in the swing torque is compensated for and satisfactory operational feeling and operation capability can be secured even when the swing electric motor 25 does not operate.

<Second Embodiment>

A hybrid hydraulic shovel in accordance with a second embodiment of the present invention will be described below with reference to FIG. 16. In this embodiment, when the swing electric motor 25 is not driven, control is executed to raise the meter-out pressure of the swing hydraulic motor 27 by use of a composite restrictor made up of the meter-out restrictor of the swing direction/flow rate control valve 37 and an restrictor of an auxiliary valve in order to increase the braking torque.

Figure 16:
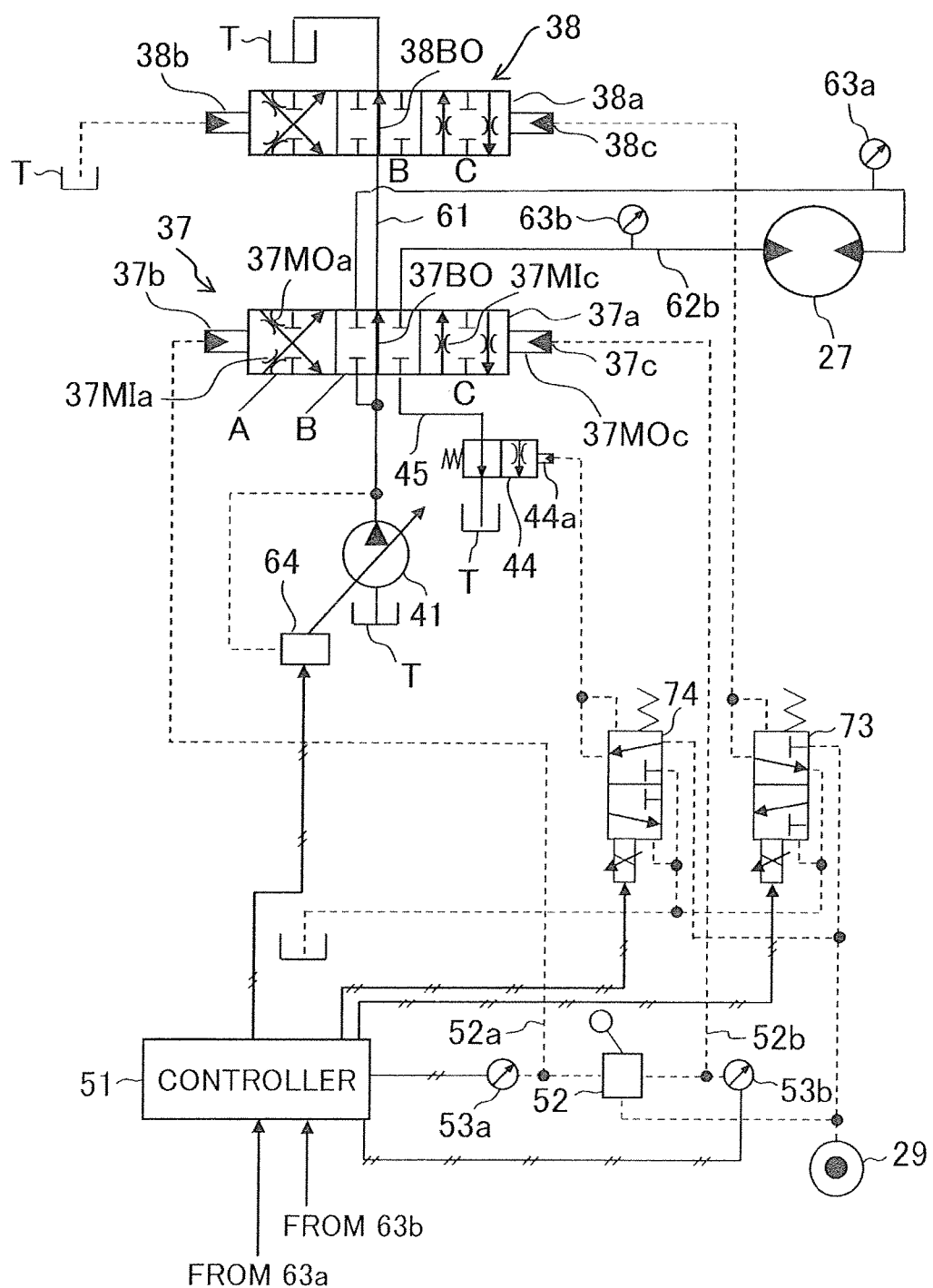
FIG. 16 is a schematic diagram (similar to FIG. 3) showing the details of the swing hydraulic system (part of the hydraulic circuit system related to the swing section) mounted on a hybrid hydraulic shovel in accordance with a second embodiment of the present invention.

FIG. 16 is a schematic diagram showing the details of the swing hydraulic system of the hydraulic circuit system in the hybrid hydraulic shovel of the second embodiment, wherein components identical with those in FIG. 1-FIG. 3 are assigned the same reference characters as in FIG. 1-FIG. 3.

Referring to FIG. 16, the swing hydraulic system in the second embodiment includes a meter-out auxiliary valve 44 and a solenoid-operated proportional pressure-reducing valve 74 instead of the solenoid-operated proportional pressure-reducing valves 71 and 72 in the first embodiment shown in FIG. 3. The meter-out auxiliary valve 44 is arranged in a meter-out hydraulic line 45 which connects the discharging end of the swing direction/flow rate control valve 37 to the tank T and through which the hydraulic fluid passing through the meter-out restrictor 37MOa or 37MOc of the swing direction/flow rate control valve 37 flows. The solenoid-operated proportional pressure-reducing valve 74 reduces the pressure (primary pressure) from the pilot hydraulic pressure source 29 according to a control signal supplied from the controller 51 and outputs control pilot pressure to a pressure chamber 44a of the meter-out auxiliary valve 44.

When the control pilot pressure is outputted from the solenoid-operated proportional pressure-reducing valve 74 to the pressure chamber 44a of the meter-out auxiliary valve 44, the meter-out auxiliary valve 44 is switched from its full-open position to a position corresponding to a decreased restrictor opening area. The meter-out auxiliary valve 44 and the meter-out restrictor (37MOa, 37MOc) of the swing direction/flow rate control valve 37 form a meter-out composite restrictor similarly to the bleed-off restrictor 37BO of the swing direction/low rate control valve 37 and the bleed-off restrictor 38BO of the center bypass cut valve 38 in the first embodiment. The meter-out composite restrictor in the second embodiment creates the opening area characteristic with respect to the lever operation amount (relationship between the opening area of the meter-out composite restrictor and the lever operation amount) indicated by the broken line in FIG. 10 (with reduced meter-out composite restrictor opening areas compared to the case where only the bleed-off restrictor 37BO of the swing direction/flow rate control valve 37 is used).

Also in this embodiment, restrictor control of the meter-out hydraulic line 45 and the open center hydraulic line 61 can be conducted similarly to the first embodiment. Therefore, in construction machines driving the upper swing structure 20 by using the hydraulic motor 27 and the electric motor 25 together, the energy of the upper swing structure in deceleration or stopping can be regenerated into electric power and the regenerated electric power can be used for assisting the driving of the upper swing structure while also securing satisfactory operational feeling and operation capability even when the electric motor 25 does not operate.

<Third Embodiment>

A hybrid hydraulic shovel in accordance with a third embodiment of the present invention will be described below with reference to FIGS. 17-19. In this embodiment, when the swing electric motor 25 is not driven, control is executed to raise the meter-in pressure of the swing hydraulic motor 27 by controlling the bleed-off restrictor of the swing direction/flow rate control valve 37 in its closing direction in order to increase the drive torque of the swing hydraulic motor 27.

Figure 17:
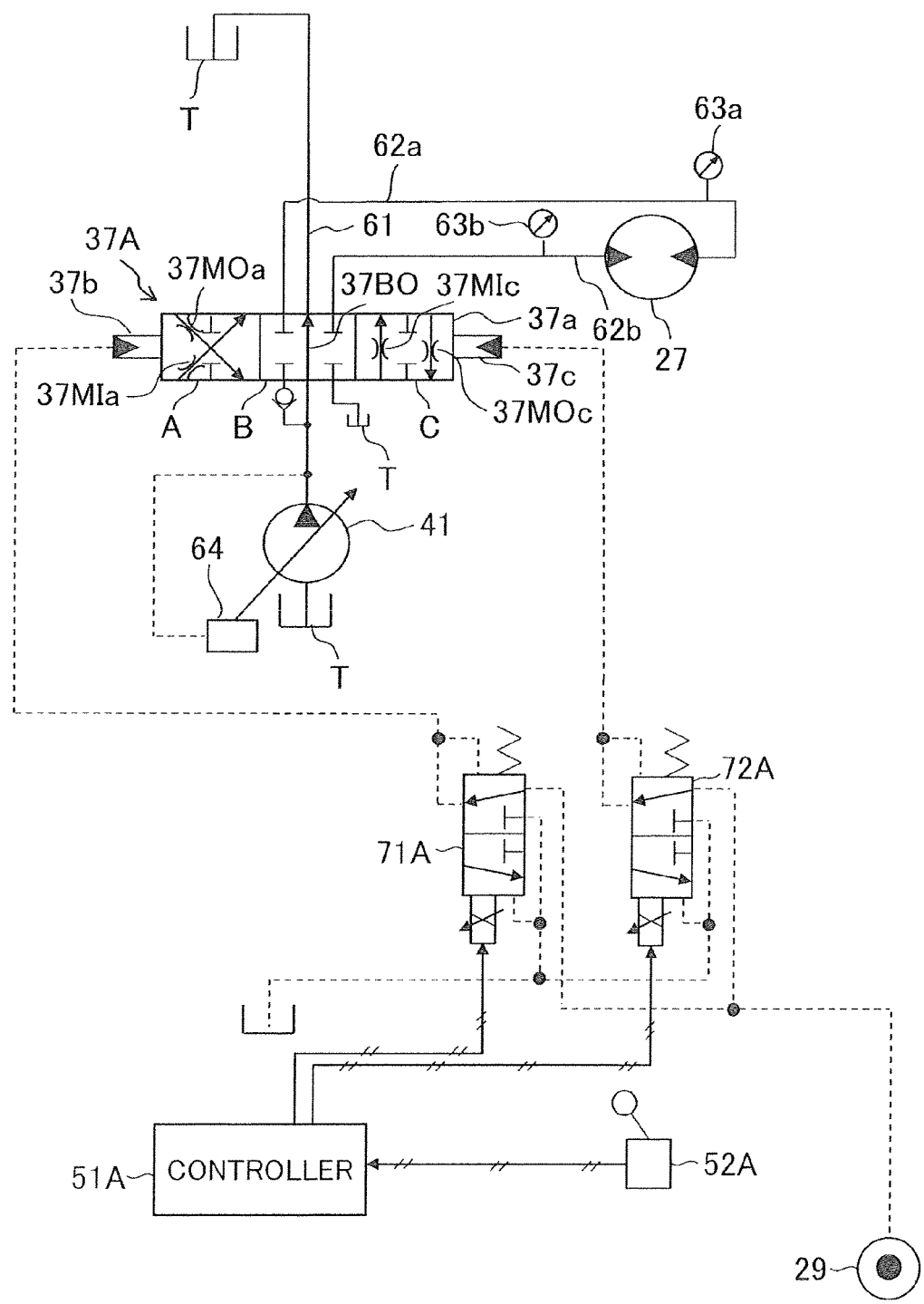
FIG. 17 is a schematic diagram (similar to FIG. 3) showing the details of the swing hydraulic system (part of the hydraulic circuit system related to the swing section) mounted on a hybrid hydraulic shovel in accordance with a third embodiment of the present invention.

FIG. 17 is a schematic diagram showing the details of the swing hydraulic system of the hydraulic circuit system in the hybrid hydraulic shovel of the third embodiment, wherein components identical with those in FIG. 1-FIG. 3 are assigned the same reference characters as in FIG. 1-FIG. 3.

Referring to FIG. 17, the swing hydraulic system in the third embodiment includes a controller 51A, an operating device 52A and solenoid-operated proportional pressure-reducing valves 71A and 72A instead of the center bypass cut valve 38, the controller 51, the operating device 52, the pressure sensors 53a and 53b and the solenoid-operated proportional pressure-reducing valves 71, 72 and 73 in the first embodiment shown in FIG. 3.

The operating device 52A is a lever-operated operating device which outputs an electric signal as the operating signal. The controller 51A receives the operating signal (electric signal) from the lever-operated operating device 52A and outputs corresponding control signals (electric signals) to the solenoid-operated proportional pressure-reducing valves 71A and 72A. Each solenoid-operated proportional pressure-reducing valve 71A, 72A reduces the pressure (primary pressure) from the pilot hydraulic pressure source 29 according to the control signal supplied from the controller 51A and outputs control pilot pressure to a corresponding one of the left/right pressure chambers 37b and 37c of the swing direction/flow rate control valve 37.

The overall processing functions of the controller 51A are identical with those shown in the flow chart of FIG. 7 in the first embodiment.

Figure 18:
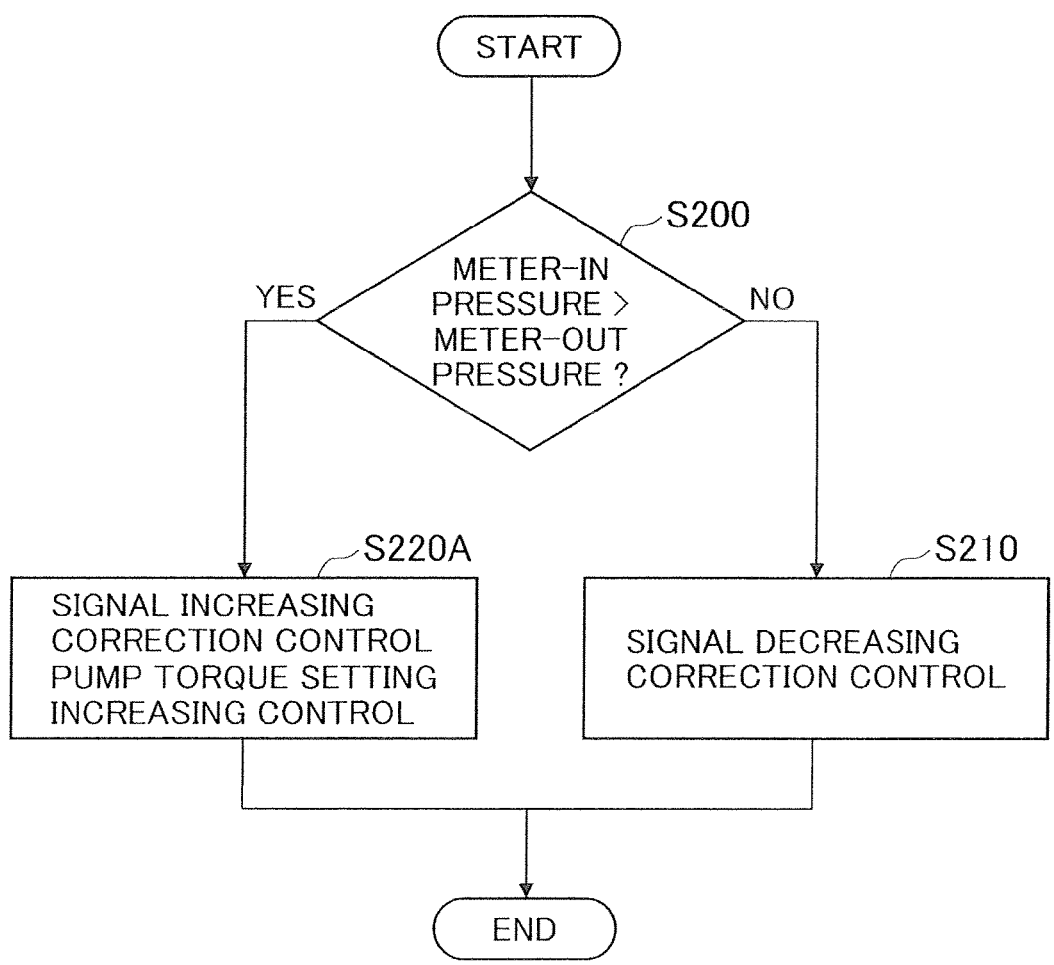
FIG. 18 is a flow chart showing the contents of the processing in the hydraulic solo swing mode (step S120) in the third embodiment.

FIG. 18 is a flow chart showing the contents of the processing in the hydraulic solo swing mode in the step S120 (shown in FIG. 7 regarding the first embodiment) in this embodiment.

Referring to FIG. 18, the controller 51A acquires information on the actual measurement values of the meter-in pressure and the meter-out pressure from the pressure sensors 63a and 63b and judges whether the meter-in pressure is higher than the meter-out pressure (step S200). When the meter-in pressure is higher than the meter-out pressure, the swing hydraulic motor 27 is in acceleration (driving), otherwise the swing hydraulic motor 27 is in braking (deceleration). In the case where the meter-in pressure is not higher than the meter-out pressure (in the braking of the swing hydraulic motor 27), the controller 51A executes signal decreasing correction control to the operating signal inputted from the operating device 52A (step S210). In the other case where the meter-in pressure is higher than the meter-out pressure (in the acceleration of the swing hydraulic motor 27), the controller 51A executes signal increasing correction control to the operating signal inputted from the operating device 52A and the torque control setting increasing control to the regulator 64 (step S220A).

The signal decreasing correction control of the operating signal in the step S210 in this embodiment is equivalent to that shown in the functional block diagram of FIG. 9 explained above, except that the operation command pressure (detected value) is replaced with the operating signal (electric signal) from the operating device 52A and the pressure reducing control of the operation command pressure is replaced with the decreasing correction control of the operating signal.

Figure 19:
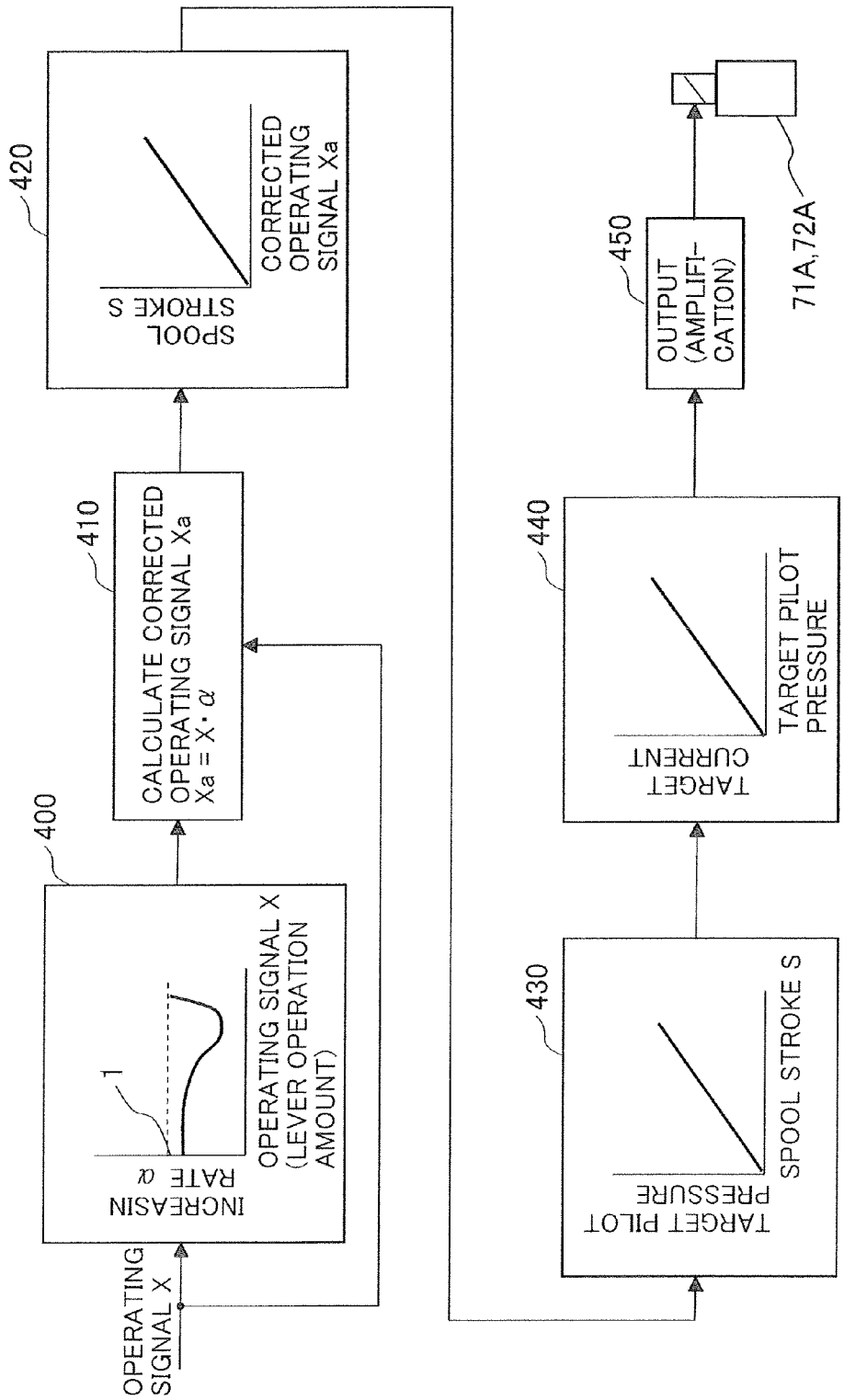
FIG. 19 is a functional block diagram showing the details of signal increasing correction control which is executed in the hydraulic solo swing mode in the third embodiment.

FIG. 19 is a functional block diagram showing the details of the signal increasing correction control executed in the step S220A. For the signal increasing correction control function, the controller 51A includes an increasing rate calculation unit 400, a corrected operating signal calculation unit 410, a spool stroke calculation unit 420, a target pilot pressure calculation unit 430, a target current calculation unit 440 and an output unit 450.

The increasing rate calculation unit 400 receives the operating signal X from the operating device 52A and calculates an increasing rate α (numerical value ≥1) for the increasing correction control of the operating signal X by referring to a table that specifies a preset functional relationship between the operating signal X and the increasing rate α. The functional relationship between the operating signal X and the increasing rate α has been set so that the opening area of the center bypass restrictor 37BO (when the opening area characteristic of the swing direction/flow rate control valve 37A is considered in terms of an opening area characteristic with respect to the lever operation amount of the operating device 52A) decreases compared to the case where the signal increasing correction control is not executed and the drive torque of the swing hydraulic motor 27 becomes equivalent to that in the hydraulic/electric combined swing mode. In other words, the functional relationship between the operating signal X and the increasing rate α has been set so that the opening area of the center bypass restrictor 37BO decreases to a value equivalent to the opening area of the swing direction/flow rate control valve in the construction machines driving the upper swing structure 20 with the hydraulic motor alone.

The corrected operating signal calculation unit 410 calculates a corrected operating signal Xa by multiplying the operating signal X from the operating device 52A by the increasing rate α.

The spool stroke calculation unit 420 converts the corrected operating signal Xa calculated by the corrected operating signal calculation unit 410 into a spool stroke S. The target pilot pressure calculation unit 430 converts the spool stroke S into a target pilot pressure. The target current calculation unit 440 converts the target pilot pressure into a target current for driving the solenoid-operated proportional pressure-reducing valve 71A or 72A. The output unit 450 amplifies the target current and outputs the amplified target current to the solenoid-operated proportional pressure-reducing valve 71A or 72A. The processes executed by the components from the spool stroke calculation unit 420 are identical with processes executed by a controller of a conventional system equipped with an operating device outputting an electric signal.

Also in this embodiment, the restrictor control of the meter-out hydraulic line 45 and the open center hydraulic line 61 can be conducted similarly to the first embodiment. Therefore, in construction machines driving the upper swing structure 20 by using the hydraulic motor 27 and the electric motor 25 together, the energy of the upper swing structure in deceleration or stopping can be regenerated into electric power and the regenerated electric power can be used for assisting the driving of the upper swing structure while also securing satisfactory operational feeling and operation capability even when the electric motor 25 does not operate.

<Modification>

The opening area characteristics of the meter-out restrictor and the bleed-off restrictor of the swing direction/flow rate control valve 37 in the present invention are not restricted to those shown in FIGS. 4 and 5 (characteristics with respect to the spool stroke) and FIGS. 10 and 11 (characteristics with respect to the lever operation amount) but can be set freely within the extent not departing from the spirit and scope of the present invention.

For example, opening area characteristics that deviate (with larger opening areas) from the conventional characteristics in intermediate zones only may also be employed as the opening area characteristics of the swing direction/flow rate control valve 37 with respect to the spool stroke. Even with such a deformation, the aforementioned advantages of the present invention can be achieved similarly.

While the opening area characteristics of the swing direction/flow rate control valve 37 with respect to the spool stroke in the example of FIGS. 4 and 5 are designed to be open wider compared to the conventional opening area characteristics, the opening area characteristics may also be set to achieve opening areas identical with the conventional opening areas. In this case, in the hydraulic/electric combined swing mode in which the swing electric motor is driven, the opening area characteristics with respect to the lever operation amount may be controlled to be open wider compared to the conventional opening area characteristics by correcting the operating signal. In the hydraulic solo swing mode in which the swing electric motor is not driven, the swing direction/flow rate control valve 37 may be driven directly with the operating signal without correcting the operating signal. Also with such a configuration, when the swing electric motor 25 is not driven, the output torque of the swing hydraulic motor 27 can be controlled to increase (compared to the case where the swing electric motor 25 is driven) by the amount corresponding to torque to be compensated for the non-driving of the swing electric motor 25, and satisfactory operational feeling and operation capability can be secured even when the swing electric motor 25 does not operate. Further, the direction/flow rate control valve 37 can be configured and implemented at a low cost in this case since the conventional direction/flow rate control valve can be employed without modification.

What is claimed is:

1. A hybrid construction machine comprising:
a lower travel structure;
an upper swing structure which is mounted on the lower travel structure to be capable of swinging;
a hydraulic circuit system which includes a swing hydraulic motor driving and swinging the upper swing structure, a hydraulic pump supplying hydraulic fluid to the swing hydraulic motor, a tank receiving the hydraulic fluid returning from the swing hydraulic motor and serving as the source of supply of the hydraulic fluid to the hydraulic pump, and a direction/flow rate control valve arranged in a line connecting the hydraulic pump and the swing hydraulic motor and controlling the direction and the flow rate of the hydraulic fluid discharged from the hydraulic pump and supplied to the swing hydraulic motor;

a prime mover which drives the hydraulic pump;

a swing electric motor which drives and swings the upper swing structure in an auxiliary manner, the swing electric motor functioning as an electric generator when the swinging of the upper swing structure is decelerating;

an electricity storage device which receives and supplies electric energy from/to the swing electric motor; and a control device which controls the operation of the swing electric motor, wherein:

when the swing electric motor is not driven, the control device controls the hydraulic circuit system so as to increase output torque of the swing hydraulic motor by an amount corresponding to torque to be compensated for the non-driving of the swing electric motor compared to cases where the swing electric motor is driven.

2. The hybrid construction machine according to claim 1, wherein when the swing electric motor is not driven, the control device controls the hydraulic circuit system to increase meter-in pressure or meter-out pressure of the swing hydraulic motor in order to increase the output torque of the swing hydraulic motor.

3. The hybrid construction machine according to claim 2, wherein:

the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank, and when the swing electric motor is not driven, the control device executes control to increase braking torque of the swing hydraulic motor by increasing the meter-out pressure of the swing hydraulic motor by controlling the meter-out restrictor of the direction/flow rate control valve in its closing direction.

4. The hybrid construction machine according to claim 3, wherein:

the hydraulic circuit system further includes an operating device which outputs an operating signal for driving the direction/flow rate control valve, and when the swing electric motor is not driven, the control device controls the meter-out restrictor or the bleed-off restrictor of the direction/flow rate control valve in its closing direction by controlling the operating signal from the operating device.

5. The hybrid construction machine according to 4, wherein:

the operating device includes a pressure-reducing valve which generates operation command pressure as the operating signal, and the control device includes a solenoid-operated proportional pressure-reducing valve which controls the operation command pressure.

6. The hybrid construction machine according to claim 2, wherein:

the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank, and the hydraulic circuit system further includes an auxiliary valve arranged in a meter-out hydraulic line through which the hydraulic fluid passing through the meter-out restrictor of the direction/flow rate control valve flows, and when the swing electric motor is not driven, the control device executes control to increase braking torque of the swing hydraulic motor by increasing the meter-out pressure of the swing hydraulic motor by controlling the auxiliary valve to narrow the meter-out hydraulic line by use of a composite restrictor made up of the meter-out restrictor of the direction/flow rate control valve and an restrictor of the auxiliary valve.

7. The hybrid construction machine according to claim 6, wherein the control device includes a solenoid-operated proportional pressure-reducing valve which outputs control pressure for driving control of the auxiliary valve.

8. The hybrid construction machine according to claim 2, wherein:

the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank, and the hydraulic circuit system further includes an auxiliary valve arranged in an open center hydraulic line through which the hydraulic fluid passing through the bleed-off restrictor of the direction/flow rate control valve flows, and when the swing electric motor is not driven, the control device executes control to increase drive torque of the swing hydraulic motor by increasing the meter-in pressure of the swing hydraulic motor by controlling the auxiliary valve to narrow the open center hydraulic line by use of a composite restrictor made up of the bleed-off restrictor of the direction/flow rate control valve and an restrictor of the auxiliary valve.

9. The hybrid construction machine according to claim 2, wherein:

the direction/flow rate control valve is a valve of an open center type which includes a meter-in restrictor connecting the hydraulic pump and the swing hydraulic motor, a meter-out restrictor connecting the swing hydraulic motor and the tank, and a bleed-off restrictor connecting the hydraulic pump and the tank, and when the swing electric motor is not driven, the control device executes control to increase drive torque of the swing hydraulic motor by increasing the meter-in pressure of the swing hydraulic motor by controlling the bleed-off restrictor of the direction/flow rate control valve in its closing direction.

10. The hybrid construction machine according to claim 1, wherein when the swing electric motor is not driven, the control device executes control to increase output torque of the hydraulic pump in order to increase the output of the swing hydraulic motor.

\* \* \* \* \*